US012697270B2

(12) United States Patent
Reuveni et al.

(10) Patent No.: US 12,697,270 B2
(45) Date of Patent: Aug. 4, 2026

(54) ROLLABLE USER-SUPPORT DEVICE

(71) Applicant: Moving Life Ltd, Netzer Sereni (IL)

(72) Inventors: Ruth Reuveni, Golan Heights (IL); Yoav Gabriely, Yokneam Ilit (IL)

(73) Assignee: Moving Life Ltd, Netzer Sereni (IL)

( * ) Notice: Subject to any disclaimer, the term of this patent is extended or adjusted under 35 U.S.C. 154(b) by 313 days.

(21) Appl. No.: 18/405,381

(22) Filed: Jan. 5, 2024

(65) Prior Publication Data

US 2024/0139059 A1 May 2, 2024

Related U.S. Application Data

(63) Continuation of application No. 17/324,395, filed on May 19, 2021, now Pat. No. 11,872,183.

(60) Provisional application No. 63/026,746, filed on May 19, 2020.

(51) Int. Cl.
*A61H 3/04* (2006.01)
*A61G 5/08* (2006.01)

(52) U.S. Cl.
CPC ............ *A61H 3/04* (2013.01); *A61G 5/0833* (2016.11); *A61G 5/0866* (2016.11); *A61G 5/0883* (2016.11); *A61G 5/0891* (2016.11); *A61H 2201/1633* (2013.01)

(58) Field of Classification Search
CPC ................ A61G 5/0833; A61G 5/0866; A61H 2201/1633; A47C 4/04
See application file for complete search history.

(56) References Cited

U.S. PATENT DOCUMENTS 4,249,774 A * 2/1981 Andreasson ............. A61G 5/14 297/316
4,929,022 A 5/1990 Geraci
6,371,142 B1 * 4/2002 Battiston .................. A61H 3/04 135/66
6,494,469 B1 12/2002 Hara et al.
6,619,681 B2 9/2003 Gutierrez
7,669,863 B2 3/2010 Steiner et al.
8,584,689 B2 11/2013 Catton
8,590,920 B2 11/2013 Masaki
8,973,997 B2 * 3/2015 Green .................. A61G 5/1067 297/DIG. 10

(Continued)

FOREIGN PATENT DOCUMENTS

CN 202891207 U 4/2013
CN 105030445 A 11/2015

(Continued)

*Primary Examiner* — Erez Gurari
(74) *Attorney, Agent, or Firm* — Ballard Spahr LLP

(57) ABSTRACT

A rollable user-support device comprising a rigid frame with first legs and second legs, each with a rollable and swivelable wheel, a seat with a seat folding mechanism and/or a seat manipulation mechanism. The seat manipulation mechanism can be operable to move the seat, with a user seated thereon, between a lower rearward seating position and an elevated forward seating position, and the seat folding mechanism can be operable to move the seat between the elevated forward seating position and a folded position, at least one of the devices being connected to a swivel prevention mechanism associated with the first wheels. The device can constitute a bi-directional rollable user-support device operable in three modes.

20 Claims, 12 Drawing Sheets

(56) References Cited

U.S. PATENT DOCUMENTS

| | | | | |
|---|---|---|---|---|
| 9,301,896 | B2 | 4/2016 | Hsieh | |
| 9,662,264 | B2 * | 5/2017 | Jacobs | A61H 3/04 |
| 9,808,394 | B1 * | 11/2017 | Jiang | A61H 3/04 |
| 9,849,050 | B2 | 12/2017 | Mcclean | |
| 9,877,175 | B2 | 1/2018 | Hussain et al. | |
| 9,907,723 | B2 | 3/2018 | Bisceglia et al. | |
| 10,639,226 | B1 * | 5/2020 | Keyes | A61H 3/04 |
| 10,881,211 | B1 * | 1/2021 | Al-Salloom | A47C 4/04 |
| 11,432,978 | B1 * | 9/2022 | Inkmann | A61H 3/04 |
| 2002/0050697 | A1 * | 5/2002 | Hallgrimsson | A61G 5/0891 280/87.051 |
| 2002/0195785 | A1 | 12/2002 | Van 't Schip | |
| 2004/0094999 | A1 * | 5/2004 | Volotsenko | B62B 1/12 297/188.1 |
| 2005/0236812 | A1 | 10/2005 | Firth | |
| 2006/0022517 | A1 | 2/2006 | Bacardit et al. | |
| 2007/0194547 | A1 * | 8/2007 | Steiner | A61H 3/04 280/87.021 |
| 2007/0278761 | A1 | 12/2007 | Firth | |
| 2008/0111341 | A1 * | 5/2008 | Borisoff | A61G 5/1054 280/250.1 |
| 2009/0206578 | A1 * | 8/2009 | Pizmony | A61H 3/04 280/648 |
| 2009/0224496 | A1 * | 9/2009 | Watts | A47C 3/18 280/47.38 |
| 2009/0278325 | A1 * | 11/2009 | Geels | A61H 3/04 280/5.28 |
| 2010/0263697 | A1 | 10/2010 | Catton | |
| 2013/0020779 | A1 | 1/2013 | Green et al. | |
| 2014/0265188 | A1 * | 9/2014 | Chang | A61G 5/101 280/47.4 |
| 2014/0371642 | A1 * | 12/2014 | Torregrosa Pascual | A61H 9/0007 601/158 |
| 2015/0048598 | A1 * | 2/2015 | Freeman | A61H 3/04 280/639 |
| 2016/0022517 | A1 | 1/2016 | Frangos et al. | |
| 2016/0296410 | A1 * | 10/2016 | Paterson | A61H 3/04 |
| 2017/0188712 | A1 * | 7/2017 | Ehlinger | A47C 7/543 |
| 2017/0202727 | A1 | 7/2017 | Wegener et al. | |
| 2018/0055231 | A1 * | 3/2018 | Hamid | A47C 4/04 |
| 2019/0151186 | A1 * | 5/2019 | Bonis | A61H 3/04 |
| 2019/0240106 | A1 * | 8/2019 | Kapec | A61H 3/04 |
| 2020/0008990 | A1 * | 1/2020 | Harrison | B62K 5/025 |
| 2020/0368097 | A1 * | 11/2020 | Michelena | A61G 5/1005 |
| 2021/0030608 | A1 * | 2/2021 | Brown | A61G 5/0825 |
| 2021/0212871 | A1 * | 7/2021 | Klein | A61G 5/1048 |
| 2021/0228433 | A1 | 7/2021 | Landry et al. | |
| 2021/0361517 | A1 * | 11/2021 | Reuveni | A61G 5/0866 |

FOREIGN PATENT DOCUMENTS

| | | | |
|---|---|---|---|
| DE | 102012014027 | B3 | 6/2013 |
| FR | 2519861 | A1 | 7/1983 |
| JP | 2000300611 | A | 10/2000 |
| JP | 2013085716 | A | 5/2013 |
| JP | 2017079964 | A | 5/2017 |
| JP | 2018102816 | A | 7/2018 |
| WO | 03099122 | A1 | 12/2003 |
| WO | 2012039604 | A1 | 3/2012 |
| WO | 2015040008 | A1 | 3/2015 |
| WO | 2016010863 | A1 | 1/2016 |
| WO | 2016032876 | A1 | 3/2016 |
| WO | 2017155629 | A1 | 9/2017 |
| WO | 2018014139 | A1 | 1/2018 |
| WO | 2018154234 | A1 | 8/2018 |
| WO | 2019022676 | A1 | 1/2019 |
| WO | 2019132108 | A1 | 7/2019 |
| WO | 2019191097 | A1 | 10/2019 |
| WO | 2019230388 | A1 | 12/2019 |

* cited by examiner

ROLLABLE USER-SUPPORT DEVICE

CROSS-REFERENCE TO RELATED APPLICATION

This application is a continuation of U.S. patent application Ser. No. 17/324,395 filed May 19, 2021, which claims priority to U.S. Provisional Patent Application No. 63/026,746 filed May 19, 2020, the disclosure of which is hereby incorporated by reference in its entirety.

TECHNOLOGICAL FIELD

The present invention is in the field of physical assistance devices, in particular a device configurable for use in various functions such as a sitting aid and a walking aid.

BACKGROUND

To aid people with physical limitations, there are several styles of rollable chairs and wheelchairs, including those that can be transformed to rollators (walkers).

U.S. Pat. No. 7,669,863 discloses a walker with a seat assembly that assists a user in rising from a seated position or sitting from a standing position. The seat assembly is mounted in a frame and includes a gas spring that deflects the seat assembly while the user is rising from the seat or dampens the deflection of the seat when the user is sitting.

U.S. Pat. No. 9,877,175 discloses a seating and walking wheelchair with an active seat and a frame. The active seat is configured to move from a seated position to a standing position. The active seat includes a seat back with an upper end and a lower end, and a seat bottom with a front end and a rear end. The rear end of the seat bottom is rotatable about a movable pivot.

U.S. Pat. No. 8,973,997 discloses a chair is operated by a pair of screw shaft-type linear actuators extend from a frame, and which may have a split seat with a drop-away front portion. One or more motors operate the screw shafts to raise the rear seat portion without changing its angular orientation. Connector links interconnect the frame with the front seat portion to drop it downwardly from under the user's thighs, while the back seat portion rises to assist the user to stand.

U.S. Pat. No. 6,619,681 discloses a seating and walking wheelchair device, which also functions as a stander and a hands-free walker. The device raises the user to a standing position from a seated position, allowing the user to propel the device by the user's legs and feet. As the seat is raised, the seat swings from generally horizontal first position to a generally vertical second position, and vice versa.

US patent application 2006/022517 discloses a mobility-assistance apparatus including a wheelchair with a seat and frame and a walker coupled and integrated into the wheelchair. The walker has a seat lift mechanism.

US patent application 2007/278761 discloses a wheelchair with a frame, a seat and apparatus for moving the seat between lowered and raised positions. A translating mechanism is attached to the frame and the seat and provides translational movement of the seat that is forwards and upwards. An assist means generates a force to move the seat from the lowered to the raised position. The seat supports the user in a seated position; and in the raised position the occupant is in a mounted stance with a major part of the occupant's weight supported.

US patent application 2005/236812 discloses apparatus for moving a seat of a wheelchair between lowered and raised positions via a translating mechanism that moves the seat forwards and upwards.

The teachings of the aforementioned publications are incorporated by reference as if fully set forth herein.

GENERAL DESCRIPTION

In accordance with a first aspect of the presently disclosed subject matter there is provided a user-support device configured to be rollable on a ground surface, comprising:

- a rigid frame having a pair of first legs and a pair of second legs, each of the first legs having a first leg distal end and at least one first wheel attached thereto so as to be rollable and swivelable; each of the second legs having a rear leg distal end with at least one second wheel attached thereto;
- a seat operably connected to the frame and positionable, by a seat manipulation and/or folding mechanism, in at least two of the following positions thereof relative to the frame: a lower rearward seating position, an elevated forward seating position and a folded position; and
- at least one wheel manipulation mechanism activatable, at least indirectly, by mechanical elements, which are optionally at least partially positioned within the frame, by the seat manipulation and/or folding mechanism and constituted by at least one, optionally two, of the following: a roll prevention mechanism operable to prevent the first wheels from rolling on the ground surface when the seat is brought into its elevated forward seating position; at least one first swivel prevention mechanism operable to prevent swiveling of the first wheels when the seat is brought into its elevated forward seating position, and at least one second swivel prevention mechanism operable to prevent the first wheels from swiveling when the seat is brought into its folded position.

The above features can allow the device to be used as a bi-directional rollable user-support device operable in at least two of the following three modes:

- a neutral mode, in which the seat is in the elevated frontward position and the first wheels are prevented from rolling and swiveling;
- a first, chair mode in which the seat is in the lower rearward position and the first wheels are allowed to roll and swivel thus constituting chair front wheels enabling the device to be rolled in a first direction with a user accommodated on the seat and facing in the first direction; and
- a second, rollator mode in which the seat is in the folded position and the first wheels are prevented from swiveling whilst the second wheels constitute rollator front wheels enabling the device to be rolled in a second direction opposite the first direction with a standing user facing in the second direction.

Thus, in accordance with a second aspect of the presently disclosed subject matter there is provided rollable user-support device configured to be rollable on a ground surface, the device comprising:

- a rigid frame having a pair of first legs and a pair of second legs, each of the first legs having a first leg distal end and at least one first wheel attached thereto so as to be rollable and swivelable; each of the second legs having a rear leg distal end) with at least one second wheel attached thereto so as to be rollable and swivelable;

a seat operably connected to the frame and positionable in a lower rearward seating position; in an elevated forward seating position and in a folded position;

a seat folding mechanism operable to manipulate the seat between the folded position and an unfolded position being elevated forward seating position, the seat in the folded position being oriented transversely to a plane defined thereby in the lower rearward seating position;

a seat manipulation mechanism operable to move the seat, with a user seated thereon, between the lower rearward seating position and the elevated forward seating position;

at least one roll prevention mechanism activatable at least indirectly by the seat manipulation mechanism and operable to prevent the first wheels from rolling on the ground surface when the seat is brought into its elevated forward seating position;

at least one first swivel prevention mechanism activatable at least indirectly by the seat manipulation mechanism and operable to prevent swiveling of the first wheels, at least after their rolling is prevented in the seat's elevated forward position, and at least one second swivel prevention mechanism activatable by the seat folding mechanism and operable to prevent the first wheels from swiveling when the seat is brought into its folded position;

the device being a bi-directional rollable user-support device operable in the following three modes:

a neutral mode, in which the seat is in the elevated frontward position and the first wheels are prevented from rolling and swiveling;

a first, chair mode in which the seat is in the lower rearward position and the first wheels are allowed to roll and swivel thus constituting chair front wheels enabling the device to be rolled in a first direction with a user accommodated on the seat and facing in the first direction; and a second, rollator mode in which the seat is in the folded position and the first wheels are prevented from swiveling whilst the second wheels constitute rollator front wheels enabling the device to be rolled in a second direction opposite the first direction with a standing user facing in the second direction.

In accordance with a third aspect of the presently disclosed subject matter there is provided a user-support device configured to be rollable on a ground surface, the device comprising:

a frame having a pair of front legs and a pair of rear legs, each of the front legs having a front leg distal end and at least one rollable and swivelable front wheel attached thereto, each of the rear legs having a rear leg distal end with at least one rear wheel attached thereto, which rear wheel is at least rollable;

a seat operably connected to the frame;

a seat manipulation mechanism operable to move the seat, with a user seated thereon, between an elevated forward seating position and a lower rearward seating position;

at least one roll prevention mechanism operable to prevent the front wheels from rolling on the ground surface when the seat is in its elevated forward seating position; and at least one first swivel prevention mechanism operable to prevent swiveling of the front wheels, at least after their rolling is prevented.

In accordance with a fourth aspect of the presently disclosed subject matter, there is provided a user-support device configured to be rollable on a ground surface, the device comprising:

a frame having a pair of front legs and a pair of rear legs, each of the front legs having a front leg distal end and at least one front wheel attached thereto so as to be rollable and swivelable; each of the rear legs having a rear leg distal end with at least one rear wheel attached thereto;

a seat operably connected to the frame and positionable in a lower rearward seating position and in an elevated forward seating position;

a safety arrangement for performing the following three steps in the device in any order: (a) bringing the seat into the elevated forward seating position, which may also reduce it's the seating length of the seat, (b) preventing the front wheels from rolling on the ground surface at least when the seat is in the elevated forward seating position, and (c) preventing the front wheels from swiveling at least when their rolling is prevented; the safety-providing arrangement comprising mechanisms for performing at least any two of said three steps while allowing performance of a remaining third step.

In the device of the this aspect, the safety arrangement can comprise a seat manipulation mechanism operable to move the seat, with a user seated thereon, between a lower rearward seating position and an elevated forward seating position in which the seat has a seating length shorter at a front area thereof relative to that in the lower rearward seating position to facilitate the user's standing up from his seated position. Alternatively or in addition, the safety arrangement can comprise one or both of the following: at least one roll prevention mechanism operable to prevent the front wheels from rolling on the ground surface when the seat is in its elevated forward seating position and at least one swivel prevention mechanism operable to prevent swiveling of the front wheels, when their rolling is prevented.

The device of each of above aspects can be a bi-directional rollable user-support device and have both front and rear wheels rollable and swivelable.

The seat of the device of each of above aspects can be capable of being brought from the elevated forward seating position into a folded position in which at least a portion of the seat has an orientation different from that in the elevated forward and lower rearward seating positions.

The device of each of the above aspects can thus have a seat folding mechanism attaching the seat to the frame and operable to move the seat between the folded position and the unfolded position being the elevated forward seating position.

The device of each of the above aspects can comprise a second swivel prevention mechanism activatable at least indirectly by the seat folding mechanism and operable to prevent the first wheels from swiveling when the seat folding device is in the folded position.

The device of each of the above aspects can thus be operable in the following three modes:

a neutral mode, in which the seat is in the elevated frontward position and the front wheels are prevented from rolling and swiveling;

a first, chair mode in which the seat is in the lower rearward position and the front wheels are allowed to roll and swivel enabling the device to be rolled in a first direction with a user accommodated on the seat and facing in the first direction; and a second, rollator mode in which the seat is in the folded position and the front wheels, which in this mode function as rollator rear wheels, are prevented from swiveling whilst the rear wheels constitute rollator front wheels, enabling the device to be rolled in a second direction opposite the first direction with a standing user facing in the second direction.

In accordance with a fifth aspect of the presently disclosed subject matter there is provided a bi-directional user-support device operable in, and manipulable between a first, chair mode, in which the device is rollable in a first direction with a user sitting thereon, and a second, rollator mode, in which the device is rollable in a second direction opposite to the first direction, by a standing user facing in the second direction, the device comprising:

a frame having a pair of first legs and a pair of second legs connected thereto, the first legs constituting front legs when the device is in the first mode and the second legs constituting the front legs when the device is in the second mode;

at least one first wheel attached to a distal end of each of the first legs, and capable of rolling and swiveling;

at least one second wheel attached to a distal end of each of the second legs and capable of rolling and swiveling;

a seat capable of being brought into a deployed position in which it can at least partially accommodate a seated user facing in the first direction and into a folded position in which at least a portion of the seat has an orientation different from that in the deployed position of the seat;

a seat folding mechanism attaching the seat to the frame and operable to move the seat into the folded position when bringing the device from the first mode to the second mode and into the deployed position when bringing the device from the second mode into the first mode; and a swivel prevention mechanism operable to prevent the first wheels from swiveling when the seat is brought into the folded position.

In the device of each of the above aspects, the seat can have a seating length which is shorter at a front area thereof when the seat is in the elevated forward position relative to that in the lower rearward seating position.

More particularly, the seat can have a main, rearward seat portion and an auxiliary forward seat portion and is manipulable between the following three positions:

a lower rearward seating position, in which the main seat portion and the auxiliary seat portion are disposed adjacent each other and aligned to provide a pre-determined seating length along a horizontal plane;

an elevated seating position, in which the main seat portion maintains its orientation when moving from a lower rearward seating state; and at least a majority of the auxiliary seat portion is lower relative to the main seat portion, and is oriented transversely thereto whereby the seating length of the seat is reduced; and a folded position in which the main seat portion and the auxiliary seat portion change their orientation relative to that in the lower seating state and a length of their total projection on the horizontal plane is smaller than the reduced seating length of the seat in the elevated state.

In the device of each of the above aspects, the seat manipulation mechanism and the seat folding mechanism can be considered as a single seat manipulation and folding mechanism operable to move the seat between the lower seating state and the elevated seating state and between the elevated seating state and the folded state.

In accordance with a sixth aspect of the presently disclosed subject matter, there is provided a foldable user-support device configurable to be positioned on a ground surface and comprising:

a seat having a main, rearward seat portion and an auxiliary forward seat portion and manipulable between the following three positions:

a lower rearward seating state, in which the main seat portion and the auxiliary seat portion are disposed adjacent each other and aligned to a lower rearward seating position, in which the main seat portion and the auxiliary seat portion are disposed adjacent each other and aligned to provide a pre-determined seating length along a horizontal plane;

an elevated seating position, in which the main seat portion maintains its orientation when moving from a lower rearward seating state; and at least a majority of the auxiliary seat portion is lower relative to the main seat portion, is oriented transversely thereto whereby the seating length of the seat is reduced; and a folded position in which the main seat portion and the auxiliary seat portion change their orientation relative to that in the lower seating state and a length of their total projection on the horizontal plane is smaller than the reduced seating length of the seat in the elevated state; and a seat manipulation and folding mechanism configured to move the seat between the lower seating state and the elevated seating state and between the elevated seating state and the folded state.

The device of each of the above aspects, can further have each of the features described below.

The main seat portion and the auxiliary seat portion can have a juxtaposed disposition when the seat is in its lower rearward position, allowing the two portions together to accommodate a seated user in the lower rearward seating position of the seat, and wherein the auxiliary portion is operable at least indirectly by the seat manipulation mechanism to change its orientation so as to reduce the seating length of the seat, when the seat is moved into its elevated forward seating position, allowing only the main portion to accommodate a seated user in the elevated forward seating position.

The main seat portion can have the same orientation in the elevated and lower positions allowing it to support a user in both these positions.

The auxiliary seat portion can be positioned lower than the main seat portion and oriented transversely thereto when the seat is in the elevated forward position.

The seat manipulation mechanism can include at least one piston configured to store energy when the seat is moved towards the lower rearward position, and to release its stored energy when the seat is moved towards its elevated forward position.

The at least one roll prevention mechanism can comprise a roll prevention member associated with each first wheel and manipulable between a roll-enabling state in which the front wheel can be rolled and a roll-arresting state in which the front wheel is prevented from rolling; and a roll-prevention trigger member activatable at least indirectly by the seat manipulation mechanism when the seat is brought thereby into elevated forward seating position, and operable to bring the roll prevention member into the roll-arresting state.

The at least one swivel prevention mechanism can be operable to change the state of the first wheels from a swivel-enabling state, when the seat is in the lower rearward seating position, into a swivel arrested state in which the first wheels are prevented from swiveling when the seat is in the elevated forward seating position.

The at least one first swivel prevention mechanism can comprise a swivel arresting member associated with the first wheel and manipulable between a swivel-enabling state in which the swivel-enabling state of the first wheel is allowed, and a swivel-arresting state in which the swivel arresting member prevents the first wheel from swiveling; and a swivel-prevention trigger member activatable at least indirectly when the roll-prevention trigger member brings the roll prevention member into the roll-arresting state and operable to bring the swivel arresting member into the swivel-arresting state.

The frame can be rigid and at least its legs and, optionally, the entire frame can be non-foldable.

The seat manipulation mechanism can be connected to the first legs of the frame.

The roll prevention mechanism and the swivel prevention mechanisms can comprise activating elements extending within the front legs, via which these mechanisms are connected to the seat manipulation mechanism.

The frame can comprise a lower portion and an upper portion extending upwardly therefrom, and wherein the lower portion comprises the first and second legs and a strengthening bar connecting between the second legs.

The frame can comprise a right and a left frame member, each having a frame member lower portion with one first and one second leg, and a frame member upper portion.

The device can further a pair of extendable user-support arms connected to the frame member upper portions and operable to transition between a lower arm position in which a part of the arms is located in the frame upper portions for use when the device is in the first mode, and an extended arm position for use at least when the device is in the second mode.

All mechanisms of the device can be free of electrical connections and electrical power source.

In the folded state of the seat, at least most of the seat can extend along the frame, in a side view of the device.

The at least one roll prevention mechanism and the at least one first swivel prevention mechanism can be actuatable simultaneously.

The device can comprise a backrest which maintains its orientation when the seat is in the lowered rearward seating position and in the elevated forward seating position, in which the seat is disposed farther from the backrest than in the lower rearward position.

The backrest can be operably connected to the frame so as to be moveable between: a backrest deployed position in which the backrest is spaced rearwardly from the seat, at least a majority thereof is disposed above the plane defined by the seat, and the seat is oriented transversely to this plane when the seat is in the lower rearward position, and a backrest folded state in which the backrest is disposed adjacent the seat and extends along the seat when the seat is in the folded position.

The device can further comprise a backrest folding mechanism operable to move the backrest between the deployed state and the folded state. The backrest folding mechanism can be operably connected with the seat folding mechanism so as to activate the seat folding mechanism when the backrest folding mechanism is actuated.

When the frame comprises the frame members having the upper and lower portions as mentioned above, the backrest can be connected at least to the frame member upper portions.

The backrest and the backrest folding mechanism can be such that in the deployed position the backrest forms with the plane defined by the seat when in the lower rearward seating position, a first angle and in the folded state, the backrest forms with said plane a second, acute angle smaller than the first angle. In the folded position of the backrest, at most of it can extend along the frame in a side view of the device.

In accordance with a seventh aspect of the presently disclosed subject matter, there is provided a bi-directional user-support device operable in, and manipulable between, a first, chair mode, in which the device is configured to accommodate a seated user facing in a first direction, and a second, rollator mode, in which the device is rollable at least in a second direction opposite to the first direction, by a standing user facing in the second direction, the device comprising:

- a frame having an upper portion and a lower portion with a pair of first legs constituting front legs of the device when in the first mode, and a pair of second legs constituting front legs of the device when the second mode, the legs having respective wheels at their distal ends and the legs extending downwardly from the upper portion;
- a seat attached to the frame and capable of being brought into a deployed position in which it can at least partially accommodate a seated user facing in the first direction and into a folded position in which at least a portion of the seat has an orientation different from that in the deployed position of the seat;
- a backrest operably connected to the frame separately from the seat so as to enable the backrest to be brought into a backrest deployed position for providing support to the user's back, in which at least a majority thereof is positioned above the frame and above the seat and into a backrest folded position in which at least a majority of the backrest extends along the frame, in a side view of the device; and
- a backrest folding mechanism operable to move the backrest between the deployed position when bringing the device into the first mode, and the folded position when bringing the device into the second mode; and
- a seat folding mechanism attaching the seat to the frame and activatable at least indirectly by the backrest folding mechanism, and operable to move the seat into the folded position when bringing the backrest into the folded position thereof and into the deployed position when bringing the backrest into the deployed position thereof.

When the backrest of the device of this sixth aspect is in the deployed position it can form with the plane defined by the seat when in the lower rearward seating position a first angle, and in the folded state, the backrest forms with said plane a second, acute angle smaller than the first angle. When the backrest is in the folded position, at least most of it can extend along the frame.

In the device of this sixth aspect, the first wheels of the first and second legs can be rollable and swivelable.

The device of this aspect can further comprise a seat manipulation mechanism operable to move the seat, with a user seated thereon, between an elevated forward seating position and a lower rearward seating position, the elevated forward seating position constituting the deployed position of the seat into which it can be unfolded.

The device of this aspect can further comprise at least one roll prevention mechanism operable to prevent the first wheels from rolling on the ground surface when the seat is in its elevated forward seating position. Alternatively or in addition, the device can comprise at least one first swivel prevention mechanism operable to prevent swiveling of the first wheels when the seat is in the elevated forward seating position. In both cases the In the device of this aspect, the orientation of the seat in the folded position is different from that in the elevated forward and lower rearward seating positions.

In the device of this aspect, the seat folding mechanism can be operable to activate a second swivel prevention mechanism to prevent the first wheels from swiveling when the seat folding device is in the folded position.

The device of this aspect can thus be operable in the following three modes:

- a neutral mode, in which the seat is in the elevated frontward position, the backrest is in its deployed position, and the front wheels are prevented from rolling and swiveling;
- a first, chair mode in which the seat is in the lower rearward position, the backrest is in the same deployed position as in the neutral mode, and the front wheels are allowed to roll and swivel enabling the device to be rolled in a first direction with a user accommodated on the seat and facing in the first direction; and
- a second, rollator mode in which the seat and the backrest are in the folded position and the front wheels, which in this mode function as rollator rear wheels, are prevented from swiveling whilst the rear wheels constitute rollator front wheels, enabling the device to be rolled in a second direction opposite the first direction with a standing user facing in the second direction.

In the device of this aspect, the seat can have a seating length which is shorter at a front area thereof when the seat is in the elevated forward position relative to that in the lower rearward seating position. More particularly, the seat can have a main, rearward seat portion and an auxiliary forward seat portion and is manipulable between the following three positions:

- a lower rearward seating position, in which the main seat portion and the auxiliary seat portion are disposed adjacent each other and aligned to provide a predetermined seating length along a horizontal plane;
- an elevated seating position, in which the main seat portion maintains its orientation when moving from a lower rearward seating state; and at least a majority of the auxiliary seat portion is lower relative to the main seat portion, and is oriented transversely thereto whereby the seating length of the seat is reduced; and
- a folded position in which the main seat portion and the auxiliary seat portion change their orientation relative to that in the lower seating state and a length of their total projection on the horizontal plane is smaller than the reduced seating length of the seat in the elevated state.

In the device of this aspect, the seat manipulation mechanism and the seat folding mechanism can be considered as a single seat manipulation and folding mechanism operable to move the seat between the lower seating state and the elevated seating state and between the elevated seating state and the folded state.

As mentioned above, in each of the above aspects, the mechanisms can be connected to each other solely or at least mostly by mechanical connections so that each mechanism is mechanically activated by, or mechanically activates, or both, at least indirectly, at least one of the other mechanisms of the device, thereby allowing the device to be user-friendly, i.e. free of means requiring a user to coordinate/control the operation of the mechanisms in different modes of operation of the device. In particular, the backrest folding mechanism can be operable to mechanically activate the seat folding mechanism, in order to bring the seat from its elevated forward state into its folded state or vice versa, for the device to be used in the rollator mode. The one of these two mechanisms which is activated first to bring the device into the folded state can be activated manually, e.g. by a user pulling the backrest or pushing the seat, or by using a control button. The backrest folding mechanism or the seat folding mechanism can be operable to mechanically activate the corresponding swivel prevention mechanism to prevent swiveling of the first/front legs when the device is in the folded state, to facilitate its use as a rollator. The seat manipulation mechanism activated by a user's raising himself with the help of arms of the device or by pressing a control button, can be operable to mechanically activate the roll prevention mechanism and the corresponding swivel prevention mechanism to arrest/lock the first/front wheels when the seat is in the elevated forward seating position, thereby enabling the user to be safely supported by the device when sitting high or standing up.

As also mentioned above, in each of the above aspects, at least a part of mechanical elements connecting between different mechanisms, such as elements involved in roll and swivel prevention, can be disposed within the frame.

In each of the above aspects, each of the first wheels of the device, i.e. the wheels operable as front wheels when the device in its neutral or first, chair mode, can be associated with a caster assembly comprising a swivel caster holding wheel and operable to allow swiveling of the wheel; the assembly comprising at least one roll prevention mechanism configured to prevent rolling of the wheel and at least one swivel prevention mechanism different from the roll prevention mechanism operable to prevent swiveling of the wheel.

In the above caster assembly, the at least one swivel prevention mechanism can be a first swivel preventing mechanism and the assembly can further comprise at least one second swivel prevention mechanism actuatable separately and independently from the first swivel preventing mechanism.

Each of the first and second swivel prevention mechanism can be operable to lock the caster after its partial rotation to a first and a second predetermined angle, respectively, in the direction of rolling, the first and second angles being different.

Thus, in accordance with a still further aspect of the presently disclosed subject matter, there is provided a caster assembly for holding a wheel assembly comprising a swivel caster configured for connecting a wheel thereto and operable to allow swiveling of the wheel; the assembly comprising at least one roll prevention mechanism configured to prevent rolling of the wheel and at least one swivel prevention mechanism different from the roll prevention mechanism operable to prevent swiveling of the wheel.

The at least one swivel prevention mechanism can be a first swivel preventing mechanism and the assembly further comprises at least one second swivel prevention mechanism actuatable separately and independently from the first swivel preventing mechanism.

Each of the first and second swivel prevention mechanism can be operable to lock the caster after its partial rotation to a first and a second predetermined angle, respectively, in the direction of rolling, the first and second angles being different.

The at least one roll prevention mechanism and the at least one first swivel prevention mechanism are actuatable simultaneously.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF EMBODIMENTS

Illustrative embodiments of the invention are described below. In the interest of clarity, not all features/components of an actual implementation are necessarily described.

Figure 2:
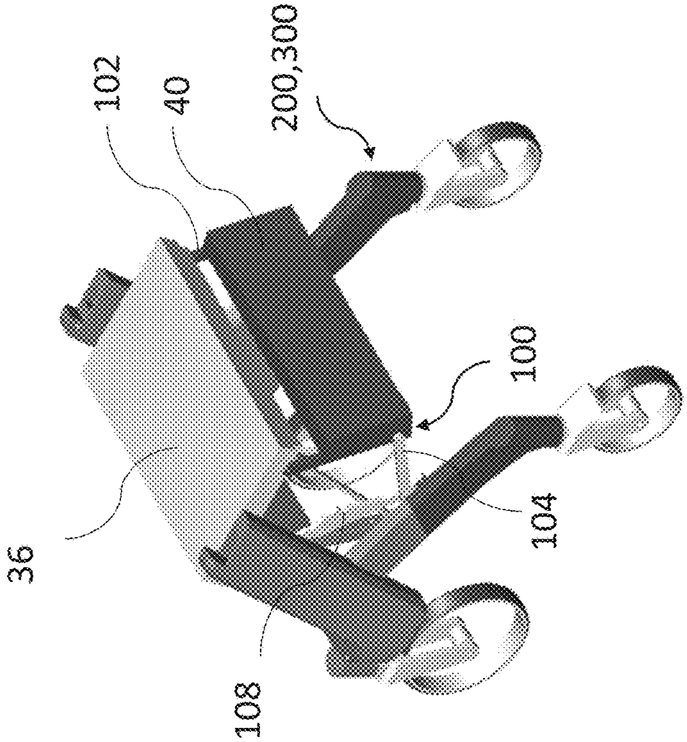
FIG. 2 is a view as in FIG. 1 wherein the device is in an elevated seat position.
Figure 1:
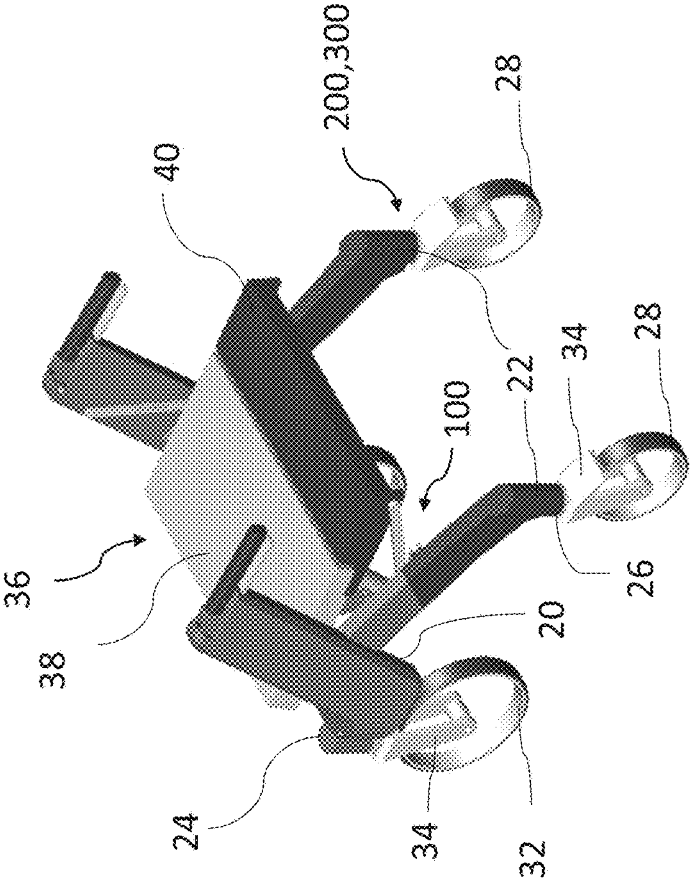
FIG. 1 is a perspective view of a rollable user-support device in accordance with exemplary embodiments of the invention, in a lower seat position.

FIG. 1 and FIG. 2 show a rollable user-support device that may be designed to support a user in either a ("lower") chair seating position (FIG. 1) or in an elevated sitting position (FIG. 2). The lower seating position is useful for several implementations, including use as a rollable and swivelable chair, including a desk chair and a conveniently maneuverable chair for use in compact places such as bathrooms and the like, which may be useful for positioning a handicapped or person with motor issues to closely approach a toilet or a car seat. The elevated sitting position is useful for providing support to a user who wishes to be in a relatively elevated position, such as when conversing with people who are standing, or facing and adjacent a kitchen or bathroom sink, and so on. The elevated position may also be useful for aiding a user to get to a standing position.

Alternatively or additionally, the rollable user-support device may be designed to allow specific control of the wheels, front wheels and/or rear wheels. In particular, the user support device may be configured to allow a combination of rolling and/or swiveling options, in particular via one or more mechanisms that control the wheels, which, in some designs is in conjunction with the particular seat position.

The rollable user-support device includes a rigid frame 20 including right and left frame members fixedly connected to each other (for example via a frame strengthening bar) having an upper portion and a lower portion, which is constituted by a front leg 22 and a rear leg 24. Each of the front legs has a distal end 26 with at least one front wheel 28 disposed at those distal ends. Each of the rear legs 24 has a distal end 26 with at least one rear wheel 32 disposed at those distal ends. The wheels are illustrated as single wheels, however, they may be constituted by a set of wheels, such as a pair of wheels. At least front wheels 28 can be configured to be both rollable and swivelable, as will be described in further detail hereinbelow, with reference to FIGS. 18-21). For example, front legs 22 and rear legs 24 can include swivel casters 34 to provide for the rolling and swiveling feature, as is known; however, at least one particular design of the casters will be described in detail hereinbelow, with reference to FIGS. 18-21.

Frame 20 has a seat 36 operably connected thereto. Seat 36 may be a 1-part seat, or a multi-part seat such as the illustrated 2-part seat. Seat 36 may be configured to be positionable in a lower rearward seating position (FIG. 1) and in an elevated forward seating position (FIG. 2). In such designs, the device includes a seat manipulation mechanism 100 configured to maneuver the seat between the lower rearward seating position and the elevated forward seating position. This seat manipulation mechanism 100 can be operated electrically; however, in particular designs, it can be operated entirely by mechanical means. The initial position of the device, in particular seat 36, is the seat elevated position, ready for the device to be sat upon to bring to a lower seat state (chair mode) and ready to be folded to a folded state (rollator mode). The initial position can be brought into the lower seat position via seat manipulation mechanism 100 and can be actuated with the user's weight/force once the user sits thereon.

In the case of the 2-part seat 36, the seat includes a rearward seating portion 38 (which may interchangeably be referred to as a main seating portion 38 herein the specification and claims), which is intended for supporting the user's buttocks; and a forward seating portion 40 (which may interchangeably be referred to as an auxiliary seating portion 40 herein the specification and claims), which in the lower sitting position is intended to provide support to the user's thighs. In this 2-part configuration, in the elevated position (FIG. 2), forward seating portion 40 is designed to fold downward. As seen, rearward seating portion 38 maintains its orientation with respect to the ground while being moved from its lower position to its elevated position (and vice versa)—typically substantially horizontal. In particular designs, seat manipulating mechanism 100 is configured to fold a 2-part seat, as will be described hereinbelow, with reference to FIGS. 7-9.

The device may also include at least one swivel prevention mechanism 300 configured to allow the front wheels 28 to be prevented from swiveling (in some designs independently, and in some designs in conjunction with the position of seat 36, in particular, when the seat is in its elevated position, as will be described hereinbelow). Swivel prevention mechanism 300 may be constituted by known means, or using a particular design, as will be described hereinbelow, with reference to FIGS. 16-18).

The device may also include at least one roll prevention mechanism 200 configured to prevent front wheels 28 from rolling when the seat is in the elevated position. Such a configuration maybe advantageous for providing a stable base for a user in an elevated position, such as when adjacent a kitchen/bathroom sink, or the like). Roll prevention mechanism 200 may be constituted by known means, or by way of a particular design that is entirely mechanical, as will be described hereinbelow, with reference to FIGS. 16-18).

In some designs, the rollable user-support device is configured to include seat manipulation mechanism 100 and swivel prevention mechanism 300. In some designs, the rollable user-support device is configured to include seat manipulation mechanism 100 and roll prevention mechanism 200. In some designs, the rollable user-support device is configured to include swivel prevention mechanism 300 and roll prevention mechanism 200. In some designs, the rollable user-support device is configured to include seat manipulation mechanism 100; swivel prevention mechanism 300; and roll prevention mechanism 200.

Any one or all three of the aforementioned mechanisms may be operated by electrical means. However, in particular designs, at least one of the three aforementioned mechanisms is entirely constituted by mechanical means; in some particular designs, at least two of the three aforementioned mechanisms are entirely constituted by mechanical means; and in some particular designs, all three aforementioned mechanisms are entirely constituted by mechanical means.

In a particular example, seat manipulation mechanism 100 is operatable by the user, whilst roll prevention mechanism 200 and swivel prevention mechanism 300 are operable directly or indirectly by the seat manipulation mechanism 100 so that the change of the position of the seat triggers the change of the state of front wheels 28. Thus, when the device is in its initial state ("high chair", neutral/ready for use mode), with its seat 36 in the elevated forward position, at least its front wheels 28 are prevented from rolling and swiveling until the seat is lowered into its lowered position (as a normal rollable chair) in which the front wheels are rollable and swivelable (released from their roll-prevention and swivel-prevention state). When the user (e.g. by shifting weight forward and rising) causes the seat manipulation mechanism 100 to start elevating seat 36, the seat manipulation mechanism at least indirectly causes the roll prevention mechanism 200 and swivel prevention mechanism 300 to prevent the device from rolling and swiveling. The seat manipulation mechanism 100 can be controllable by a user manipulating with his center of gravity and/or a control system.

Best seen in FIGS. 2 and 7-9, seat manipulation mechanism 100 includes a pair of seat portion attachment brackets 102 connecting between rearward seating portion 38 and forward seating portion 40. Seat portion attachment brackets 102 are pivotally attached at a relatively forward location of rearward seating portion 38. Seat manipulation mechanism 100 also includes a swivel-prevention trigger member (104) in the form of a pair of forward seating portion-to-frame connection brackets 104 pivotally attached at upper ends thereof to the front or sides of forward seating portion 40, for example respectively attached at a pivot points at seat portion attachment brackets 102. At their lower ends, brackets 104 are pivotally attached to frame 20.

Seat manipulation mechanism 100 also includes a pair of frame-to-rear seating linkages 106 pivotably connecting frame 20 to rearward seating portion 38, at a location behind to where seat portion attachment brackets 102 are attached. Linkages 106 may include a set of pivotably connected linkage sections (three illustrated), including a lower linkage section 110; an intermediate linkage 112; and an upper linkage 114, where the intermediate linkage is pivotable connected at its respective ends to the lower linkage and the upper linkage.

Suitable lengths of seat portion attachment brackets 102 in combination with suitable lengths of forward seating portion-to-frame connection brackets 104 and frame-to-rear seating linkages 106 can be chosen to ensure that rearward seating portion 38 remains in a generally horizontal orientation during manipulation of seat 36, which, as noted above, is moved from a rearward lower position to an elevated forward position (and vice versa).

Seat manipulation mechanism 100 may be powered by manual means, for example by a crank or the like; or mechanical means using, for example, a spring.

However, in some particular designs, seat manipulation mechanism 100 includes a pneumatic seat movement assist mechanism that includes at least one piston 108 (FIG. 3), and typically a pair thereof. Pistons 108 can store energy in a contracted state that is usable to elevate seat 36 and thus help the user to rise from the seat or to achieve their elevated seating position. Conversely, the relatively extended piston 108 is also useful so as to help the user sit in a lower position, as the piston can be configured to be slowly compressed thereby relieving the user from supporting their weight with their legs and/or arms while going to the lower (regular) sitting position.

Pistons 108 are pivotally attached at a lower end thereof to frame 20 and pivotally attached at an upper end thereof to the side or bottom of rearward seating portion 38, typically at a relatively rear portion of the rearward seating portion.

The device shown in above-referenced FIGS. 1 and 2 can be convertible from a chair into a rollator/walker by having the chair's front wheels function as rear wheels in the rollator mode. This functionally can be operably connected with the foldability of the seat. In particular, the device can include a seat folding mechanism operable to bring the seat, and specifically its rearward seating portion, from an elevated state, when the front wheels are arrested, into a folded state in which the seat or at least its rearward seating portion is folded in a position substantially parallel to an upper portion of the frame. The seat folding mechanism can be so connected, at least indirectly, with a wheel manipulation mechanism as to prevent the wheels, now functioning as rear wheels, of the rollator from swiveling, when the seat is brought into the folded state. In particular, to cause the rollator's rear wheels to be in alignment with the frame when the rollator is rolled.

FIGS. 3-6 show a bi-directional rollable user-support device, which is adjustable between an elevated seating state (see also FIG. 2) configured for the user facing in a first direction 42; and a rollator/walker mode configured for the user to walk upright and be supported, while facing in a second direction 44, opposite the first direction. In other words, the bi-directional user-support device is operable in and manipulable between a first mode (chair) allowing the user to sit on its seat either in elevated position, FIG. 2 with the wheels being arrested; or in a lower sitting position, FIG. 1, in which the bi-directional rollable user-support device is rollable on a ground surface in first direction 42 with a user is sitting thereon, and a second mode (rollator/walker), in which the bi-directional rollable user-support device can be rolled by a standing user on the ground surface in second direction 44.

The bi-directional rollable user-support device is configured to be operable in and manipulable between a first mode (chair), in which the device can be rolled on a ground surface in first direction 42 with a user sitting thereon, and a second mode (rollator/walker), in which the device is rollable by a standing user on the ground surface in second direction 44, which is opposite to the first direction.

The bi-directional rollable user-support device includes the components noted with reference to FIGS. 1 and 2, namely: frame 20; front legs 22; rear legs 24; swivel casters 34, with rollable and swivelable front wheels 28 and rollable rear wheels 32 which in this case are also swivelable; and seat 36.

As the device is bi-directional, the "front wheels" will be termed "first wheels" 28*a*; and the "rear wheels" will be termed "second wheels" 32*a*.

Figure 4:
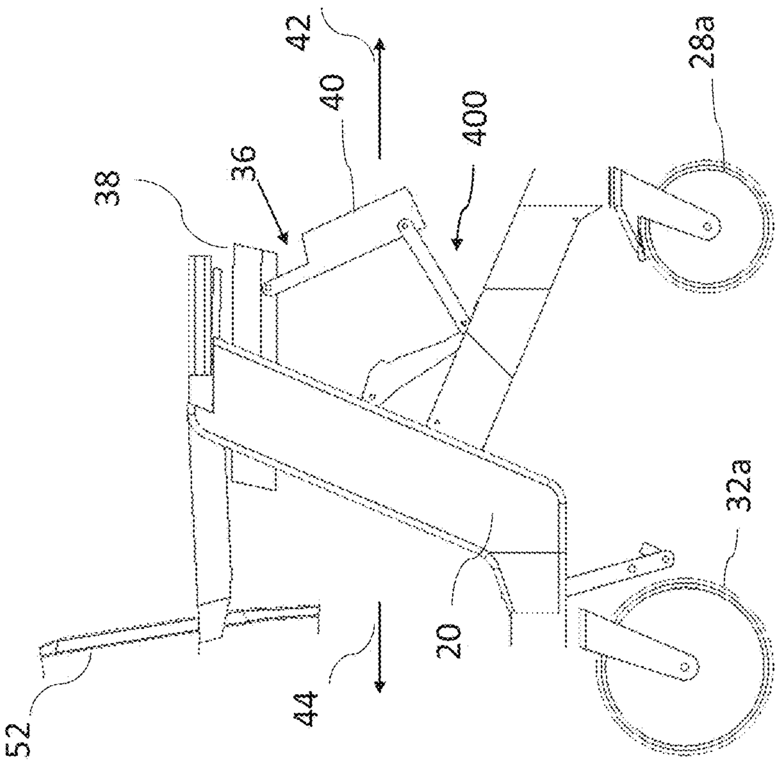
FIG. 4 is a side view of FIG. 3.
Figure 3:
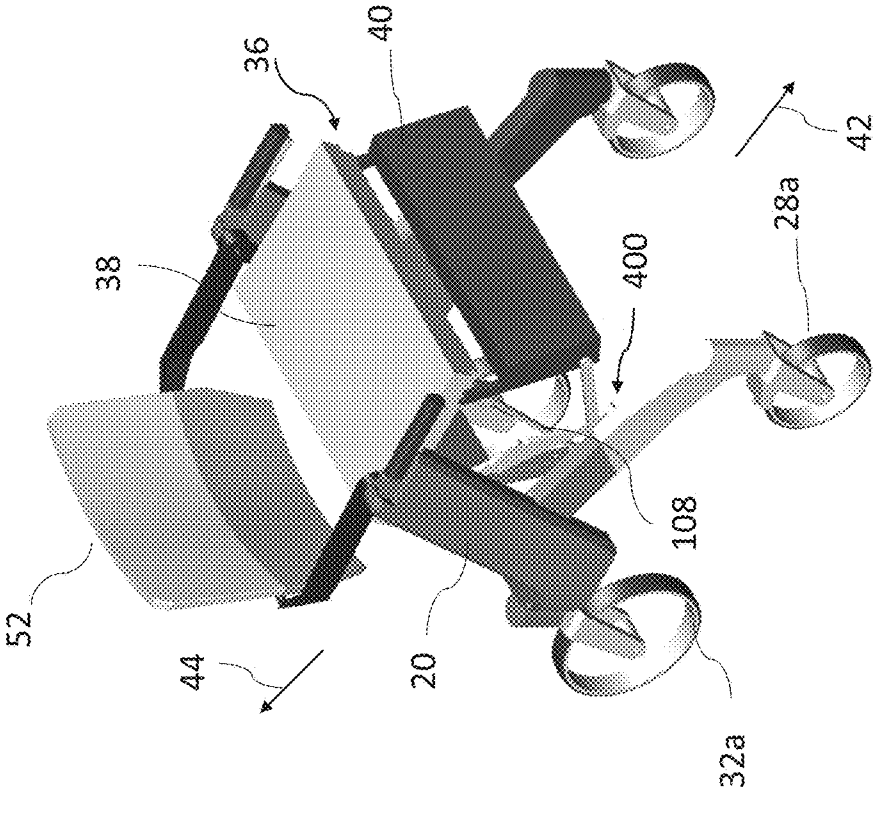
FIG. 3 is a view as in FIG. 2, wherein the device includes a backrest and armrest.

When the bi-directional rollable user-support device is in its first mode (chair or elevated chair; FIGS. 3 and 4), "first wheels" 28*a* are functioning as "front wheels", and are configured to roll and swivel, and the user is seated and faces in first direction 42.

Figure 6:
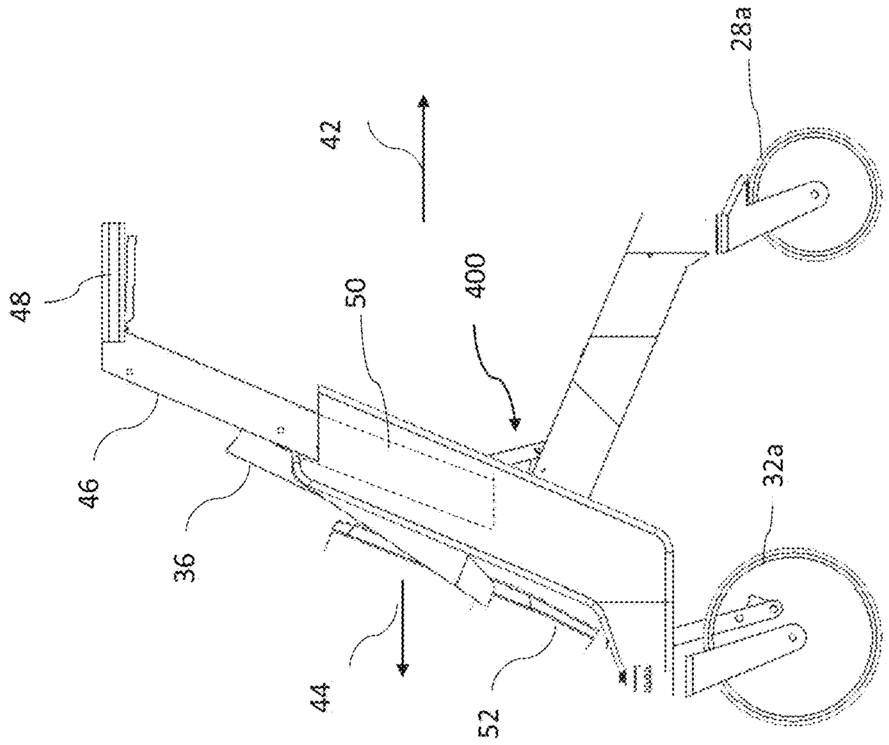
FIG. 6 is a side view of FIG. 5.
Figure 5:
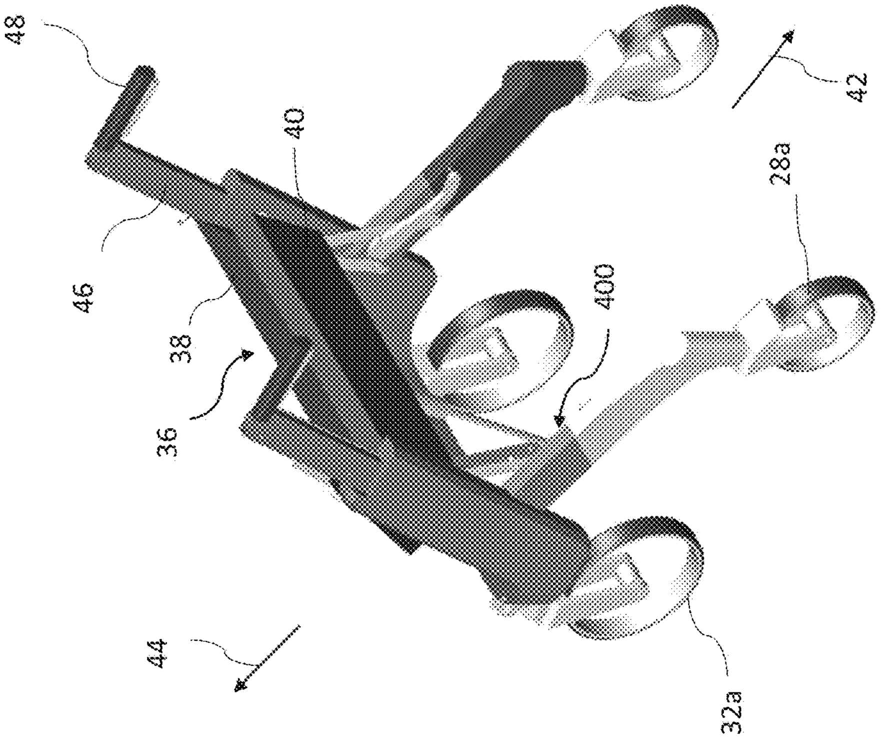
FIG. 5 is a perspective view of the device in a rollator mode.

When the bi-directional rollable user-support device is in its second mode (rollator/walker; FIGS. 5 and 6), it is "second wheels" 32*a* that now are functioning as a "front wheels", and are configured to roll and swivel, and the user is standing and faces in second direction 44.

Figure 12:
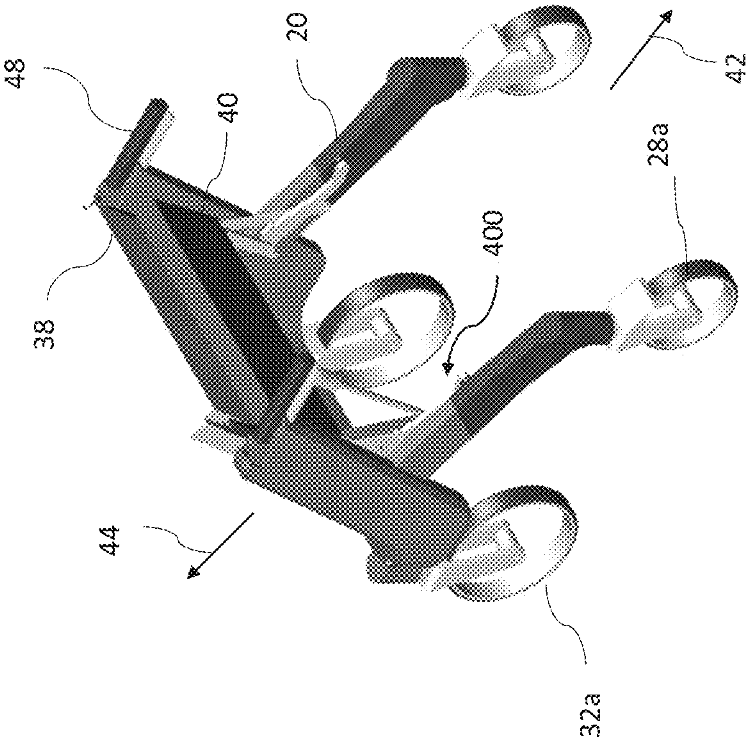
FIG. 12 is a view as in FIGS. 1 and 2 in a rollator mode.

Although frame 20 can be designed to provide support for the user while standing (e.g. rollator for a relatively short user; FIG. 12, or wherein the frame is relatively tall), for convenience in the rollator/walker configuration, the bi-directional rollable user-support device typically includes a pair of upwardly extendable user-support arms 46 with handles 48. In a particular design, frame 20 includes a pair of elongated arm receiving recesses 50 (FIG. 6) configured to receive arms 46 and a mechanism to allow extension of the arms and to lock the arms in chosen arm extension positions. Such arm locking mechanisms are well known and will not be described.

The bi-directional rollable user-support device includes a seat manipulation and folding mechanism 400 operably attaching seat 36 to frame 20. Mechanism 400 is configured to move seat 36 between a first (deployed) state (FIGS. 3 and 4), in the first mode of the device when the seat is in its elevated position, and a second (folded) state (FIGS. 5 and 6), in the second mode of the device (rollator/walker).

Seat manipulation and folding mechanism 400 may be constituted by known means, including electrically, or via a particular entirely mechanical design. In such a mechanical design (and wherein there is no backrest) may be constituted by the same components of seat manipulation mechanism 100. To accomplish the folding, the user may press forward seating portion 40 backward in the direction of arrow 402 (FIG. 8), whereby rearward seating portion 38 will fold like a book with the forward seating portion (FIG. 9) both moving to a non-horizontal orientation.

The bi-directional rollable user-support device also includes a wheel manipulation mechanism 300 configured to enable at least first wheels 28*a* to swivel when the device is in its initial mode (FIGS. 3 and 4); and to enable second wheels 32*a* to swivel, while preventing the first wheels from swiveling when the device is in its rollator/walker mode (FIGS. 5 and 6). Wheel manipulation mechanism 300 may be constituted by known means, including electrically, or via a particular entirely mechanical design, as will be described hereinbelow, with reference to FIGS. 21-23. The device shown in FIGS. 3 and 4 has a backrest 52 and armrests 54, which might or might not be a part of the device and might, or might not, be folded when the seat is folded.

FIGS. 7-13 show a bi-directional rollable user-support device in which backrest 52 is foldable together with the seat folding. The bi-directional rollable user-support device is configured to be operated in, and manipulable between a first mode (chair), in which the device is configured to accommodate a seated user facing in a first direction, and a second mode (rollator), in which the device is rollable in the second direction, opposite to the first direction and configured to support a standing user; and in particular to control the position of seat 36 with backrest 52 with respect to frame 20. This seat and backrest positioning may advantageous to the user, for example and without limitation to any actual implementation, to provide a better line of vision and/or for more compact folding, which may be useful for storage and/or transportation of the device.

The bi-directional rollable user-support device includes frame 20 with front legs 22 and rear legs 24 connected thereto. At least one first wheel 28*a* is attached to distal ends 26 of each of front legs 22, in which the wheels are at least configured to roll and optionally to swivel. At least one second wheel 32*a* is attached to distal ends 26 of each of rear legs 24, in which the second wheels are configured to roll and swivel. Seat 36 is operably connected to the frame 20. The backrest 52 operably connected to frame 20, either directly (i.e. the frame may be suitably configured) or by other means such as via armrests 54.

Figure 9:
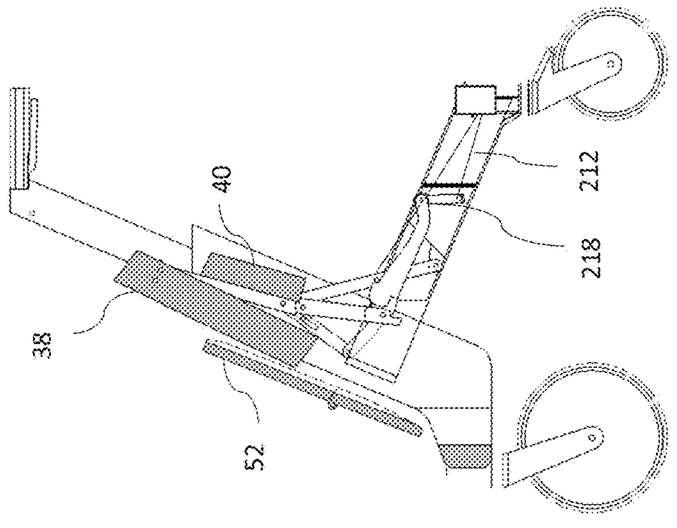
FIGS. 7-9 are side/internal views of an embodiment of the device in three modes thereof; a lower chair mode, a high-chair mode, and a rollator mode.

The bi-directional rollable seat-folding user-support device also includes a seat and backrest folding mechanism 600 configured to fold and unfold the seat 36 and backrest 52 and operably attaching seat 36 and backrest 52 to frame 20. Backrest 52 is configured to be connected at least indirectly to seat and backrest folding mechanism 600 which is operable to move backrest 52 between a first (deployed, user back-support) state in the first mode (chair) of the device, in which the backrest is positioned at least partially above frame 20 (FIGS. 7 and 8), and a second (folded) state in the second mode of the device (rollator), in which at least a portion of frame 20 is above the backrest (FIG. 9).

Figure 11:
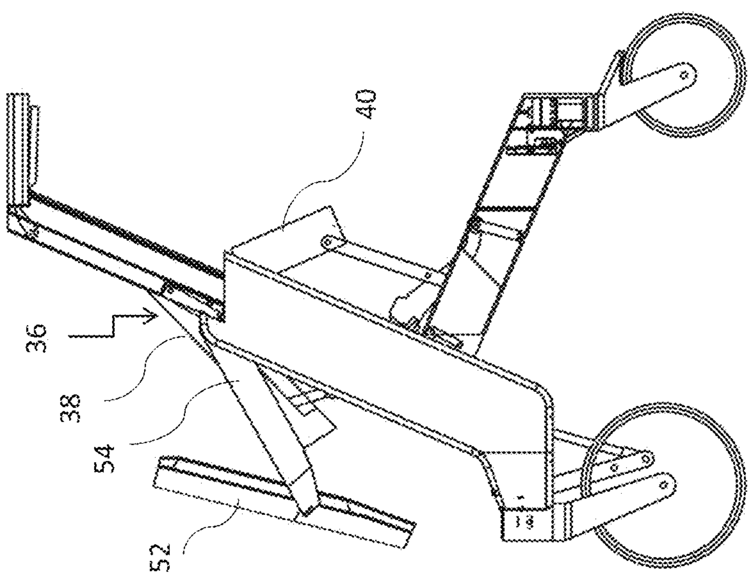
FIG. 11 is a side view of FIG. 10.
Figure 10:
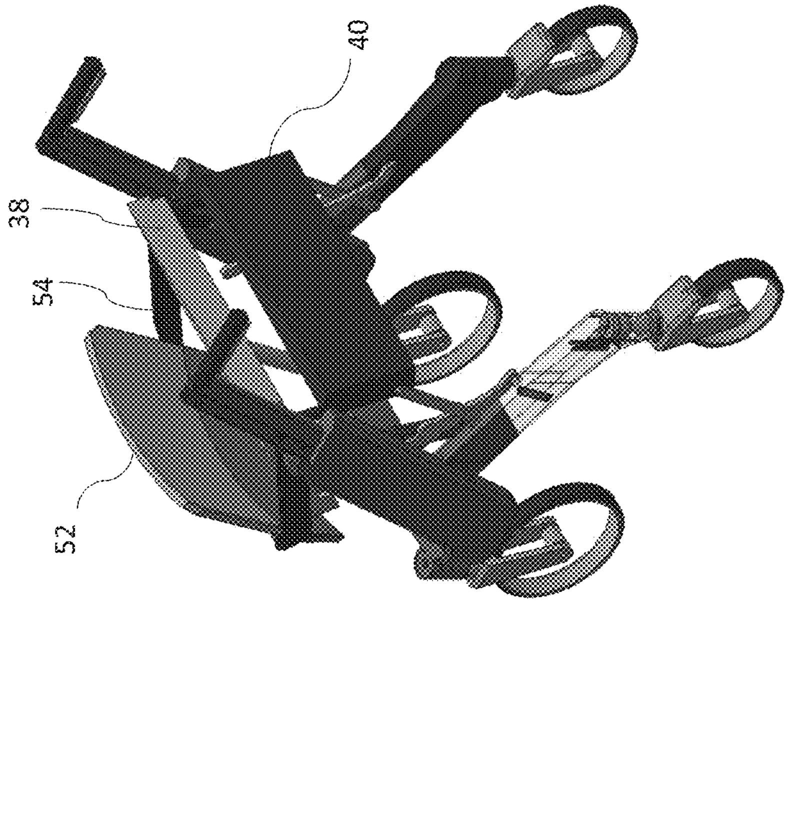
FIG. 10 is a perspective view of the device showing an intermediate folding position thereof.

FIGS. 10 and 11 show seat and backrest folding mechanism 600 in a mid-way state between an elevated seating position of the bi-directional rollable seat-folding user-support device and a folded position thereof. It can be seen that as seat 36 is transitioning, backrest 52 is being lowered and also moving to a position substantially parallel to the seat, and to the upper portion of frame 20, as illustrated in FIGS. 5 and 6.

Seat and backrest folding mechanism 600 can be operated by an electric means; however, in particular designs, mechanism 600 is entirely mechanical. In such a mechanical design, seat and backrest folding mechanism 600 may include seat manipulation mechanism 100 in combination with components configured to arrange the position of backrest 52.

Figure 20:
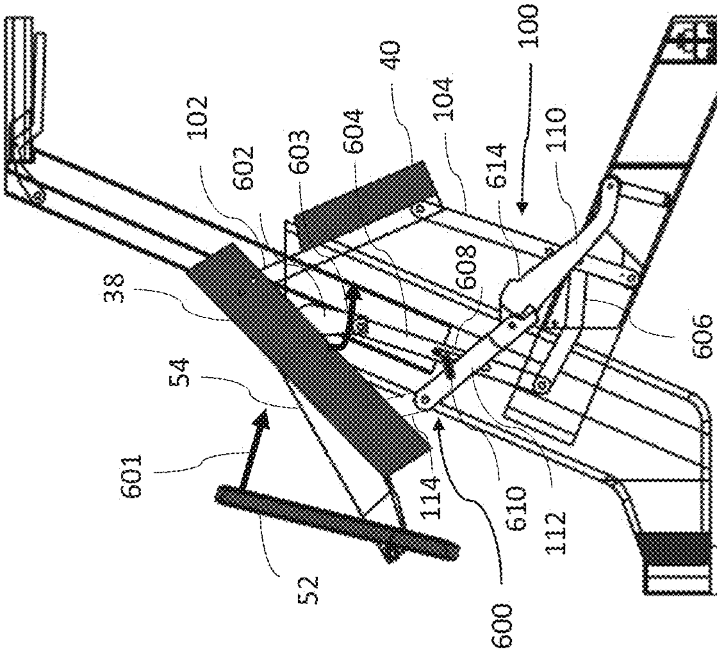
FIGS. 19-21 are side/internal views showing folding mechanisms of an embodiment of the device.
Figure 19:
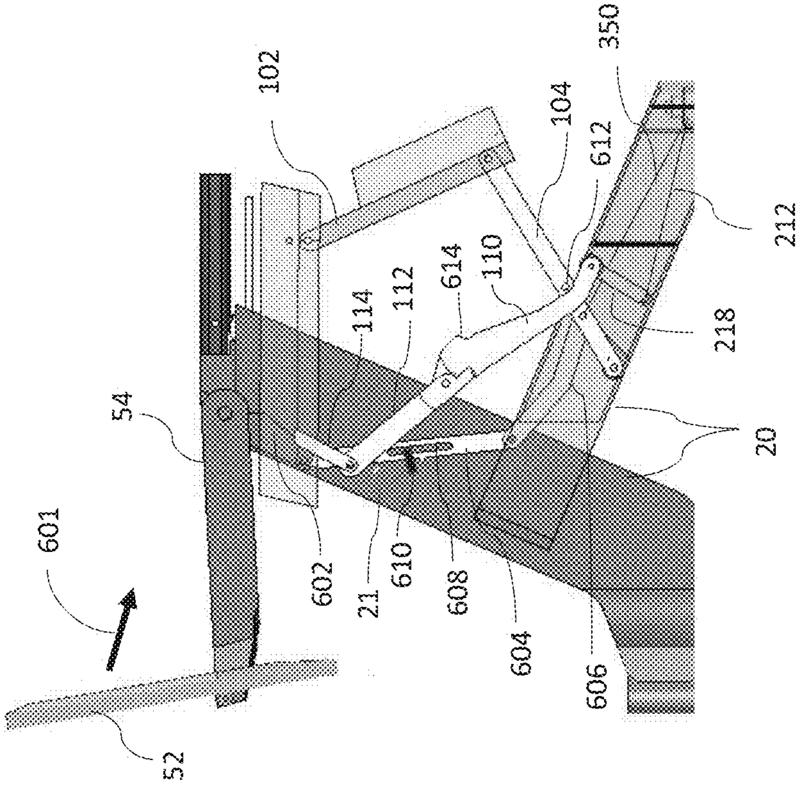
Figure 21:
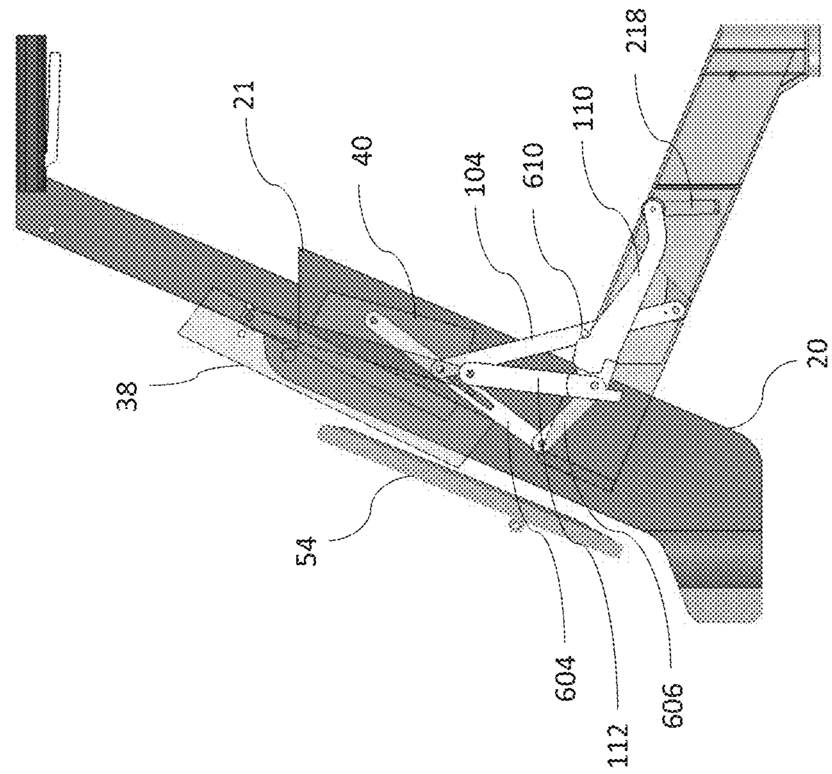

With reference also to FIGS. 19-21, seat and backrest folding mechanism 600 is depicted, including seat manipulation mechanism 100, which makes up a portion of mechanism 600.

Figure 8:
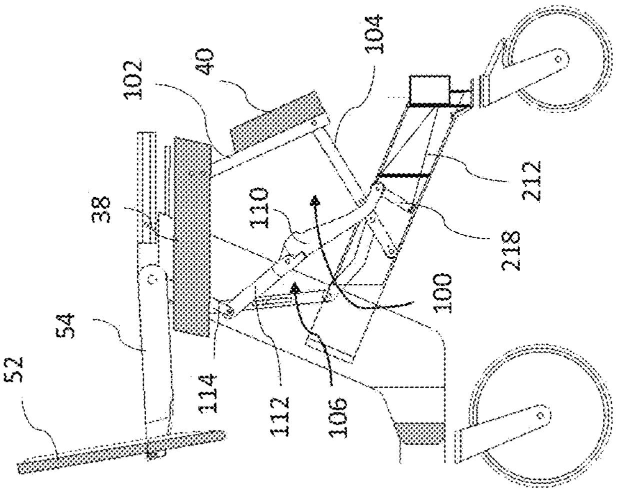
Figure 7:
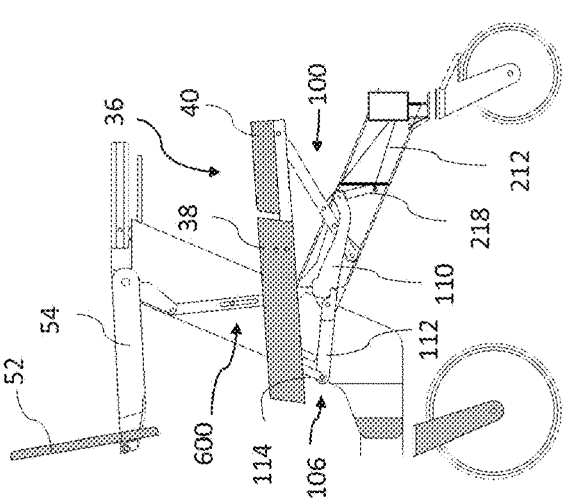

FIG. 19 illustrates seat and backrest folding mechanism 600 in an initial state of the device, prior to folding, with seat 36 is its elevated position and backrest 52 is a user back-supporting position. Backrest 52 is pivotally connected to armrest 54, which is pivotally attached to frame 20. In FIG. 20, seat 36 and backrest 52 are at an early stage of their folding transition. In FIG. 21, seat 36 and backrest 52 are fully folded and in a substantially parallel juxtaposition (in some designs within an angle of 20 degrees) and also substantially parallel (in some designs within an angle of 20 degrees) to an upwardly extended portion 21 of the upper portion of frame 20. FIGS. 7-9 illustrate similar folding positions. In designs without backrest 52 or armrests 54, the device's folded position is as illustrated in FIG. 12.

Seat and backrest folding mechanism 600 includes a plurality of linkages, for example three linkages, including an upper linkage 602 that, at its upper end, is pivotally connected to frame 20, while being fixedly connected to armrest 54. An intermediate linkage 604 is pivotally connected at its upper end to the lower end of upper linkage 602. Lower linkage 606 is pivotally connected at its upper end to the lower end of intermediate linkage 604, and at its lower end to connection bracket 104 of seat manipulation mechanism 100. Intermediate linkage 604 has an elongated slot 608 therein that receives a pivot pin 610, which is fixed to upwardly extending portion 21 of frame 20.

Connection bracket 104 has a folding mechanism pin 612 (FIG. 19) configured to slide along the upper edge of lower linkage section 110 between a bend or curve in lower linkage section 110 and a pin-receiving recess 614 at the upper end of lower linkage section 110. In the elevated seat position, pin 612 is located adjacent the bend/curve of lower linkage section 110, and in the device's folded state (rollator), pin 612 is disposed in recess 614.

To fold the device, namely to fold seat 36 and backrest 52 (as well as armrest 54), the user pulls on the backrest in the general direction 601 (FIG. 19). As a result, upper linkage 602 is moved in a clockwise direction 603 causing the upper end of intermediate linkage 604 to move in a direction similar to direction 601 and to thus pivot clockwise about pivot pin 610. As a result, the lower end of intermediate linkage 604 moves in the opposite direction (leftward in the FIGS.) to thereby pull on lower linkage 606. As lower linkage 606 is attached to connection bracket 104, and that bracket is pivotally attached at its lower end to frame 20, bracket 104 pivots toward backrest 52. When in the fully folded state, pin 612 is received in recess 614, thereby reversibly securing the folded state, and the device is ready to be used as a rollator.

Figure 15:
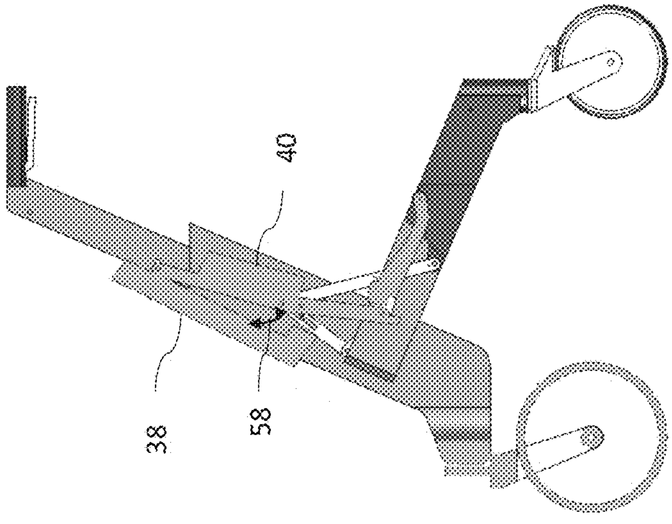
FIGS. 13-15 are side/internal views of an embodiment of the device in three modes thereof; a lower chair mode, a high-chair mode, and a rollator mode.
Figure 14:
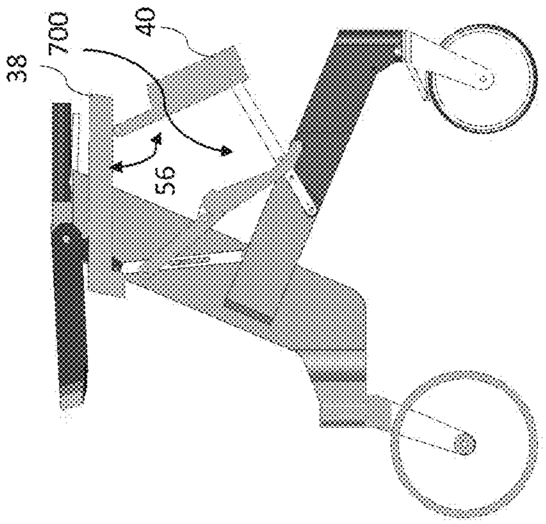
Figure 13:
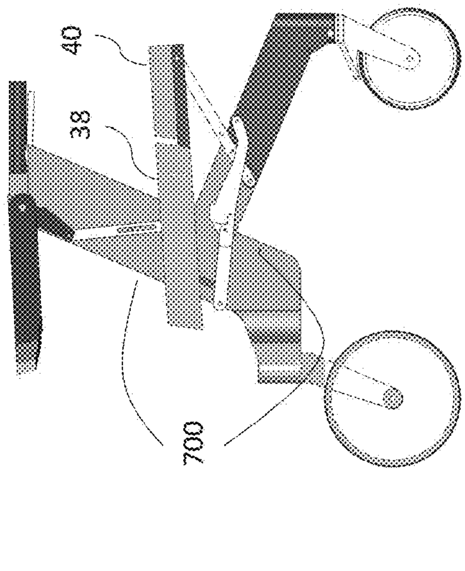

FIGS. 13-15 show a foldable user-support device including frame 20; front legs 22; rear legs 24 and seat 36, operably connected to the frame. Seat 36 has rearward seating portion 38 and forward seating portion 40 and is configured to be maneuverable between three states: (a) a lower seating state (FIG. 13), in which rearward seating portion 38 and forward seating portion 40 are substantially aligned; (b) an elevated seating state (FIG. 14), in which rearward seating portion 38 and forward seating portion 40 are angled with respect to each other at a first angle 56; and (c) a folded state (FIG. 15) in which rearward seating portion 38 and the forward seating portion 40 are angled with respect to each other at a second angle 58, which is smaller than the first angle 56.

Foldable user-support device also includes a seat folding mechanism 700 configured to maneuver seat 36 between the lower seating state (FIG. 13) and the elevated seating state (FIG. 14) and also between the elevated seating state and the folded state (FIG. 15).

FIGS. 16-18 show a caster assembly including swivel caster 34 having a caster shaft 62 in which the caster assembly is configured to allow swiveling of the wheel. The caster assembly includes a roll and swivel control mechanism 800 configured to allow wheel 28 to roll and to prevent swiveling thereof. In particular designs, swivel control mechanism 800 is configured to prevent both rolling and swiveling of wheel 28.

Figure 16B:
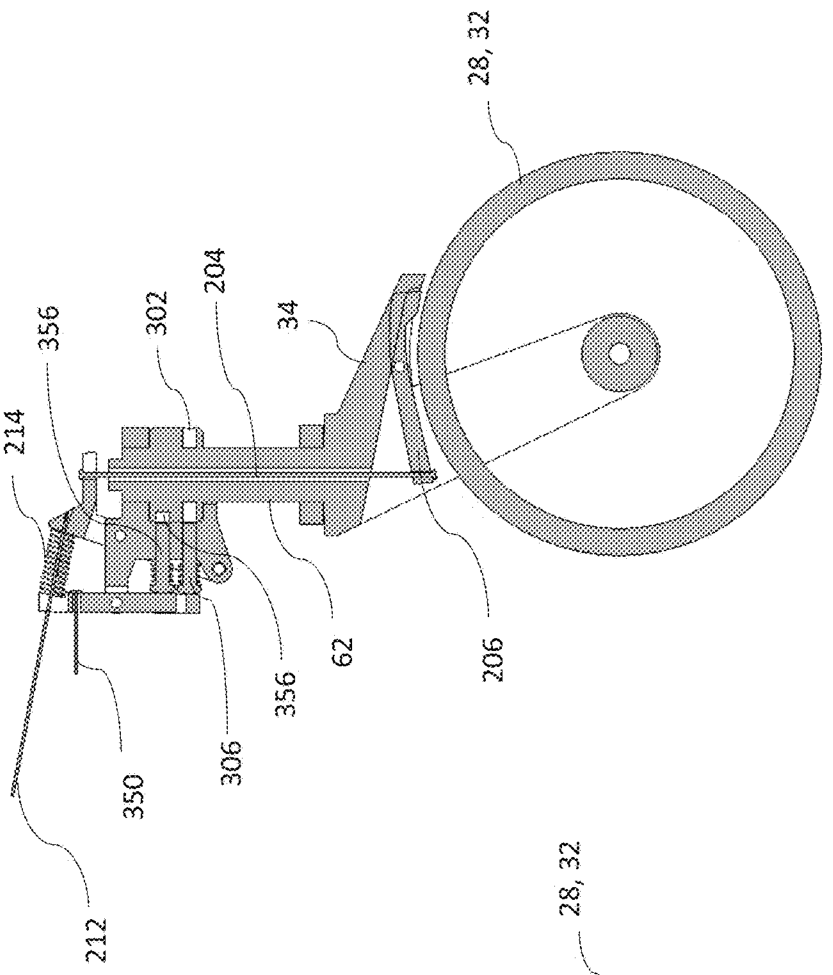
FIGS. 16A and 16B are respective perspective and side views of an embodiment of a caster of the device in a roll-enabled and swivel-enabled state.
Figure 16A:
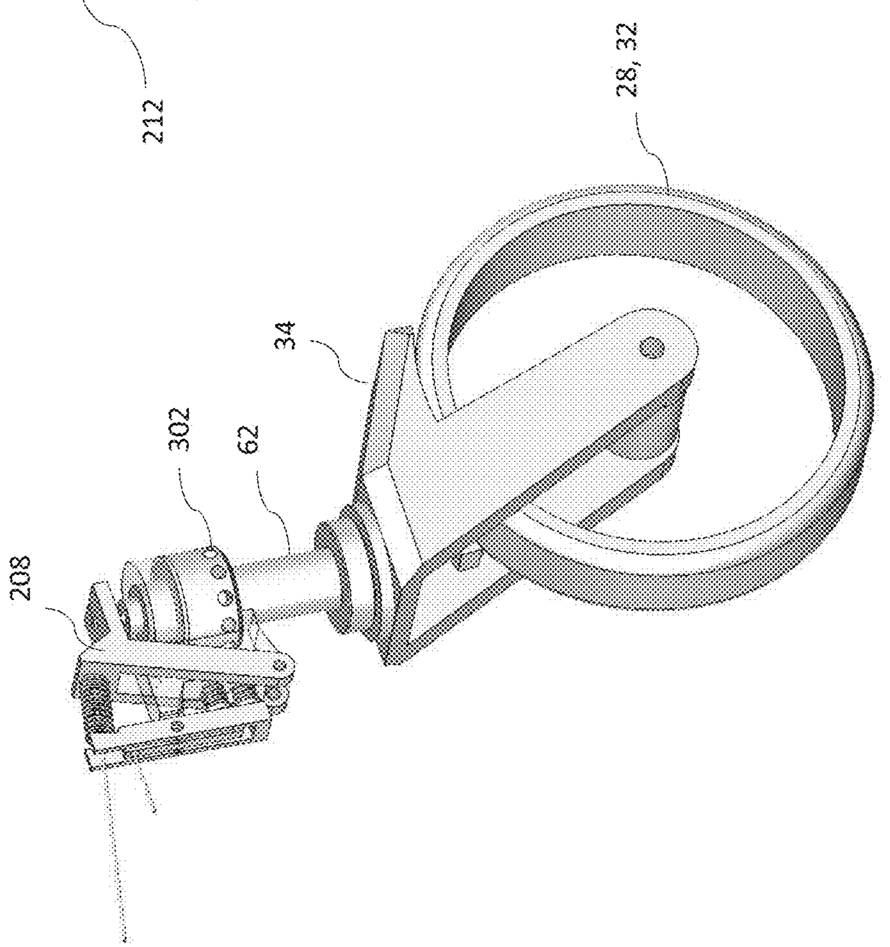

Roll and swivel control mechanism 800 may be constituted by an electrically controlled mechanism; however, in particular designs it is an entirely mechanical mechanism, as exemplified in FIGS. 16A-16B; 17A-17B; and 18A-18B. Roll and swivel control mechanism 800 includes roll prevention mechanism 200 and swivel prevention mechanism 300. It is further noted that the entirely mechanical swivel control mechanism 300 can be constituted by a mechanism configured to apply immediate prevention of wheel swiveling, for example via a clamp or other such means.

Roll prevention mechanism 200 is integrated and/or associated with swivel caster 34 and caster shaft 62. Caster shaft 62 has a longitudinal tunnel 202 running therethrough and configured to receive a roll brake rod 204, which may look like a carpentry nail with nail-heads on both sides. At its lower end, roll brake rod 204 is attached to a proximal end of roll prevention member 206 in the form of a roll brake lever 206. At its upper end, roll brake rod 204 is attached to a roll brake actuator 208.

Roll brake lever 206 is exemplified by a see-saw type lever pivotally attached to swivel caster 34, for example at about the mid-point of the lever, and at the free end of lever 206 there is a brake pad 210. At its upper end, roll brake actuator 208 is attached to one end of a roll brake actuating cable 212 (the right end of cable 212 in the FIGS.). A lower portion of roll brake actuator 208 is pivotably attached to frame 20.

Roll prevention mechanism 200 also includes a roll brake spring 214 held between roll brake actuator 208 and a swivel pin insertion lever 310 (described below) designed to actuate a mechanism for limiting wheel swivel, described hereinbelow. Cable 212 may longitudinally pass though (coil) spring 214.

Figure 17B:
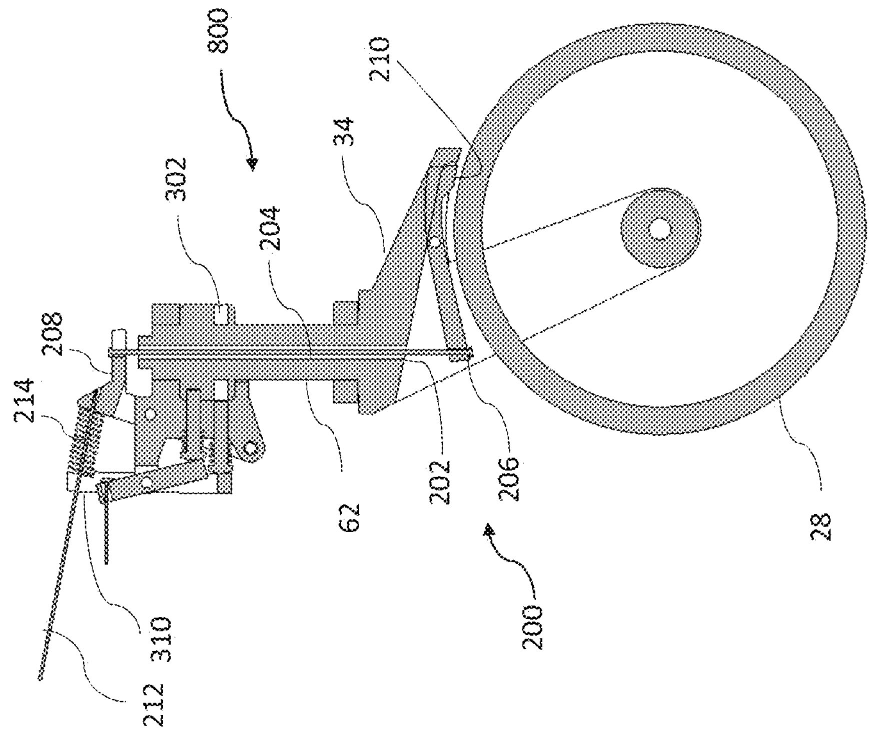
FIGS. 17A and 17B are respective perspective and side views of FIGS. 18A and 18B of the caster in a roll-enabled and swivel-prevented state, where the caster is configured to align with a rolling direction of the device.

In FIGS. 16B and 17B, roll brake spring 214 urges roll brake actuator 208 to pivot downward (clockwise in the FIGS.) thereby lowering roll brake rod 204. As a result, roll brake lever 206 seesaws (counter-clockwise in the FIGS.) to produce a gap between brake pad 210 and wheel 28. Thus, wheel 28 may roll.

Conversely, wheel 28 is prevented from rolling when cable 212 pulls on pivot roll brake actuator 208 to pivot the roll brake actuator (counterclockwise in the FIGS.) and raise the top of the roll brake actuator (spring 214 is compressed). This moves roll brake rod 204 upward whereby brake lever 206 seesaws (clockwise in the FIGS.) to force brake pad 210 downward to prevent wheel 28 from rolling.

Cable 212 is attached at its distal end (the left end in the FIGS.) to a roll-prevention trigger member 218 in the form of a roll prevention actuating member 218, which is fixed at a predetermined angle with respect to linkage section 110 of seat manipulation mechanism 100.

With reference to FIGS. 7-9, the relationship between the lower and elevated position of seat 36 and the rolling of wheel 28 is now described. When seat 36, in particular rearward seating portion 38 thereof, is moved from its lower rearward position (FIG. 7) to its elevated forward position (FIG. 8), roll prevention mechanism 200 is actuated and wheel 28 is prevented from rolling.

Figure 18B:
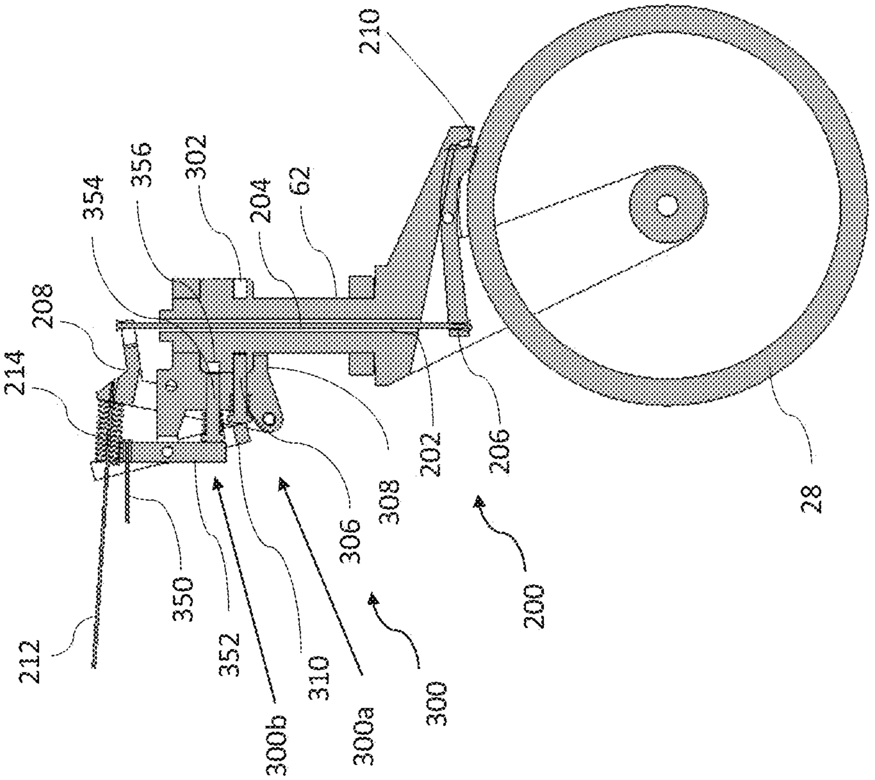
FIGS. 18A and 18B are respective perspective and side views of FIGS. 18A and 18B of the caster in a roll-prevented and swivel-prevented state.

Moving to the elevated seat position, i.e. when the user is getting up from a fully sitting to a semi-seated position, linkage 106 is moved from its position in FIG. 7 to its position in FIG. 8. This movement pivots linkage section 110 clockwise and cable 212 is pulled, preventing rolling of wheel 28 (FIG. 18B). When moving from an elevated seat position to a lower sitting position, linkage section 110 moves counterclockwise, whereby rolling of wheel 28 is allowed (FIGS. 18B and 19B).

With continued reference to FIGS. 16-18, swivel prevention mechanism 300 is now described. In particular designs, swivel prevention mechanism 300 may be configured to provide two levels of swivel prevention, a first level of swivel prevention provided by a first swivel prevention mechanism 300*a*, in which swivel caster 34 can only rotate a relatively limited amount, for example up to 30 degrees, and then is arrested; and a second level of swivel prevention provided by a second swivel prevention mechanism 300*b* in which the caster can swivel until it is aligned with a direction of rolling, and then further swiveling is prevented. The limited swiveling may be useful for safety purposes as it limits the movement of the front of the device when seat 36 is elevated so that the device stably supports the user.

First swivel prevention mechanism 300*a* will be described first, in which caster shaft 62 has a plurality (e.g. twelve) swivel limiting recesses 302 equally spaced about the shaft. For such purpose, caster shaft 62 may include a larger diameter portion 304 where swivel limiting recesses 302 are disposed in a substantially horizontal plane. Swivel limiting recesses 302 are dimensioned to receive a swivel arresting member 306 in the form of a swivel limiting pin 306 whose distal end fits into the recesses. Swivel limiting pin 306 is slidingly held horizontally at the same plane of recesses 302 by a pin holder 308.

At its proximal end, swivel limiting pin 306 interfaces with a lower end of a swivel pin insertion lever 310 so that the insertion lever can urge the pin into any one of recesses 302 when aligned therewith. Swivel pin insertion lever 310 is pivotally attached to pin holder 308 in a seesaw manner. The upper end of swivel pin insertion lever 310 interfaces with roll brake spring 214.

As noted above, when seat 36 is elevated, cable 212 is pulled. In addition to actuating roll prevention mechanism 200, pulling on cable 212 also actuates the limited swivel assembly. Cable 212 pulls on roll brake actuator 208, which compresses spring 214 so as to force the upper end of swivel pin insertion lever 310 outward (to the left in the FIGS.). Swivel pin insertion lever 310 thus pivots (counterclockwise in the FIGS.) to urge swivel limiting pin 306 into swivel limiting recesses 302. If swivel caster 34 swivels up to 30 degrees, one of the swivel limiting recesses will align with swivel limiting pin 306 and the pin will enter the aligned recess. Thus, swiveling will be prevented beyond a limit, e.g. 30 degrees in the exemplary design wherein caster shaft 62 has twelve equally spaced recesses 302. As such, the user will have a stable high chair in the elevated seat position.

In this context, the term "swivel prevention", its derivatives, uses within other terms and the like, herein the specification and claims, will be understood to mean swivel arresting after a predetermined swivel limit (spinning of wheels 28). This predetermined swivel limit is a function of the number of recesses 302.

Second swivel prevention mechanism 300*b*, via which swivel caster 34 can swivel until it is aligned with the direction of rolling, will now be described. Here, swivel prevention mechanism 300 includes a swivel prevention cable 350 attached to an upper end of a swivel alignment lever 352. Swivel alignment lever 352 is pivotally attached to pin holder 308 in a seesaw manner, for example, at the same pivot point as lever 310. A lower end of swivel alignment lever 352 interfaces with a swivel alignment and prevention pin 354, which is generally horizontally oriented. Swivel alignment and prevention pin 354 is disposed in the same plane as a single pin receiving recess 356 disposed in larger diameter portion 304. Single pin receiving recess 356 is located in portion 304 so as to align with swivel alignment and prevention pin 354 when wheel 28 trails behind shaft 62. Thus, wheel 28 rolls parallel (in alignment) with the forward movement of the device in the rollator configuration, and prevent swiveling within 180 degrees of wheel swivel.

In this context, the term "swivel prevention", its derivatives, uses within other terms and the like, herein the specification and claims, will be understood to mean swivel arresting after a predetermined swivel limit (spinning of wheels 28). This predetermined swivel limit is no greater than 180 degrees, in particular until casters 34 of first wheels 28*a* align with frame 20.

Figure 17A:
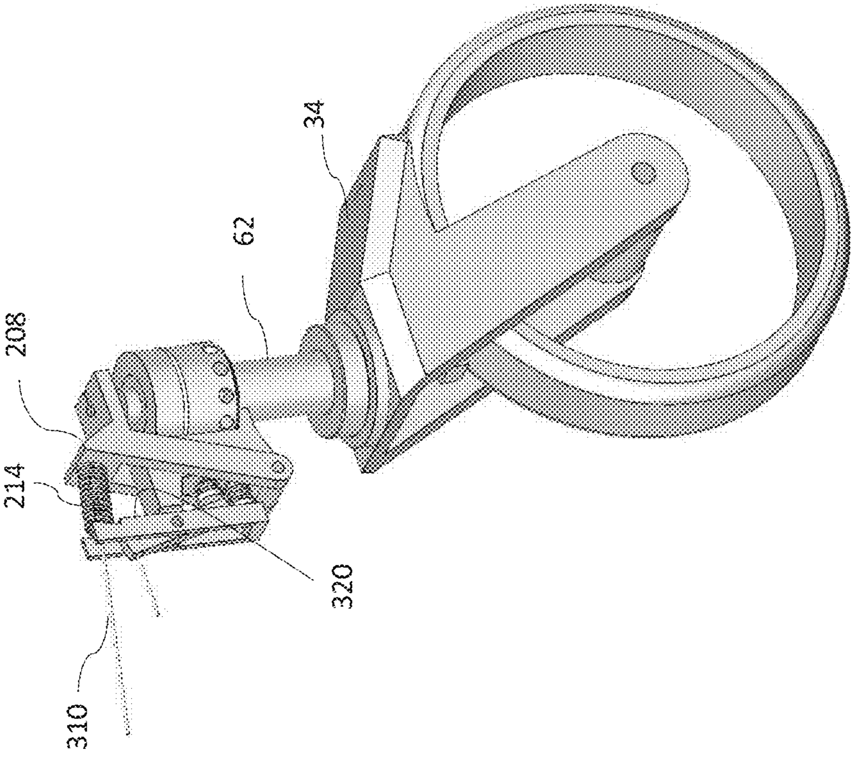
Figure 18A:
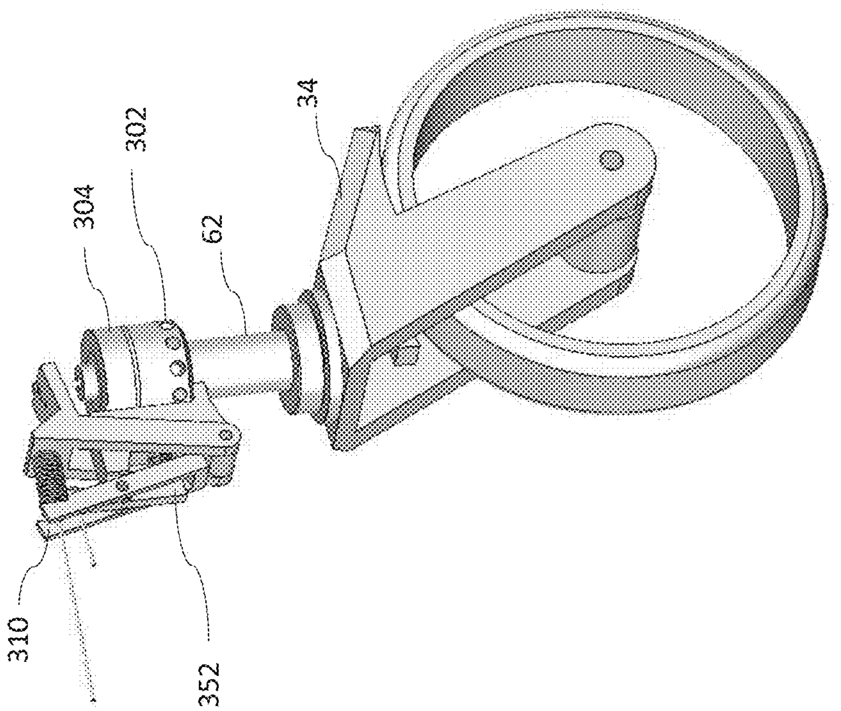

Summarizing, FIGS. 16A and 16B illustrate roll and swivel control mechanism 800 in a swivel and roll enabled state i.e. where neither swivel prevention mechanism 300 nor roll prevention mechanism 200 are actuated. FIGS. 17A and 17B illustrate roll and swivel control mechanism 800 in a roll only state (swivel arrested/locked), i.e. with swivel prevention mechanism 300 operated. FIGS. 18A and 18B illustrate roll and swivel control mechanism 800 in a locked/arrested state (roll and swivel arrested/locked), i.e. with swivel prevention mechanism 300 and roll prevention mechanism 200 both actuated.

A bi-directional rollable user-support device having all the mechanisms described above will now be described with reference to the aforementioned FIGS.

In such a design, which can be considered an "all-inclusive" design of the bi-directional rollable device, there are:

- three possible seat states: (a) lower rearward seat (chair); (b) elevated forward seat (high chair); and (c) folded seat and backrest 52 (rollator); these states are controllable by mechanism 600 and mechanism 100; and
- three possible front wheel states: (a) roll and fully swivelable (when seat (36) is in a lower rearward position); (b) roll prevention along with a substantially simultaneous swivel prevention, after a predetermined extent of swivel of first wheels 28*a*, at which time the front wheels are fully arrested (no roll and no swivel; in the seat-elevated state); and (c) roll only (rollator) and swivel prevention once first wheels 28*a* align with frame 20 as the rollator is initially rolled in the second direction, in other words no greater than a 180 degree first wheel spin until the first wheels are prevented from swiveling; the three first wheel states are controlled by mechanism 200 and mechanism 300.

Movement between the three possible seat states operably effects the three possible first wheel states, namely, (a) moving seat 36 from its lower rearward position to its elevated forward position actuates mechanism 100 resulting in the first wheels changing state from a rollable and swivelable state to a swivel prevention state (and vice versa when the seat is moved from the elevated forward position to the rearward lower position); (b) moving backrest 52 from its user back-support position to its folded position (rollator) actuates mechanism 600 resulting in first wheels 28*a* changing state from a non-rollable and non-swivelable state to a rollable non-swivelable state and first wheels functioning as rear wheels. Conversely, moving backrest 52 from its folded position (rollator) to its non-folded back supporting state results in first wheels 28 returning to functioning as front wheels, and those wheels being in a non-roll swivel prevention state.

In particular, a rollable user-support device is provided that includes all the mechanisms described above, reference to the aforementioned FIGS.

Specifically, the rollable user-support device is configured to be rollable on a ground surface and includes a rigid frame 20 (as described above) having a pair of first legs 22 and a pair of second legs 24 (as described above). Each first leg 22 has a first leg distal end 26 at which at least one first wheel 28*a* is attached and the wheels is rollable and swivelable (as described above). Each second leg 24 has a rear leg distal end 26 at which at least one second wheel 32*a* is attached and those wheels are rollable and swivelable (as described above).

The rollable user-support device includes seat 36 (as described above) operably connected to frame 20 and is positionable in three positions: a lower rearward seating position; an elevated forward seating position; and a folded position. A seat folding mechanism (as described above with reference to mechanism 600) is operable to manipulate seat 36 between the folded position and an unfolded position (the elevated forward seating position). Seat manipulation mechanism 100 (as described above) is operable to move seat 36, with a user seated thereon, between the lower rearward seating position and the elevated forward seating position.

At least one roll prevention mechanism 200 (as described above) is activatable, at least indirectly, by seat manipulation mechanism 100 and is operable to prevent first wheels 28*a* from rolling on the ground surface when seat 36 is brought into its elevated forward seating position. At least one first swivel prevention mechanism 300*a* (as described above) is activatable, at least indirectly, by seat manipulation mechanism 100 and is operable to prevent swiveling of first wheels 28*a*, at least after their rolling is prevented in the seat's elevated forward position. At least one second swivel prevention mechanism 300*b* (as described above) is actuatable by seat manipulation mechanism 100 of mechanism 600 and is operable to prevent the swiveling of first wheels 28*a* when seat 36 is brought into its folded position.

The rollable user-support device is a bi-directional rollable user-support device operable in the following three modes:

(a) a neutral mode, in which seat 36 is in the elevated frontward position and first wheels 28*a* are prevented from rolling and swiveling;

(b) a first mode (chair mode) in which seat 36 is in the lowered rearward position and first wheels 28*a* are allowed to roll and swivel (thus constituting chair front wheels 28), which enables the device to be rolled in first direction 42 with the user accommodated on seat 36 facing in the first direction; and (c) a second mode (rollator mode) in which seat 36 is in the folded position and first wheels 28*a* are prevented from swiveling whilst second wheels 32*a* function as rollator front wheels enabling the device to be rolled in second direction 44 opposite first direction 42 with a standing user facing in the second direction.

In some designs, backrest 52 (as described above) is operably connected to frame 20 so as to be moveable between (a) a backrest deployed position in which the backrest is spaced rearwardly from seat 36 and at least a majority thereof is disposed above a plane defined by the seat and is oriented transversely to this plane when the seat is in its lowered rearward position, and (b) a backrest folded state in which the backrest is disposed adjacent the seat and extends along a plane of the seat when the seat is in the folded position. Backrest folding mechanism 600 is operable to move backrest 52 between the deployed state and the folded state.

In some designs, a backrest folding mechanism (as described above with reference to mechanism 600) is operably connected with a seat folding mechanism (as described above with reference to mechanism 100) so as to actuate the seat folding mechanism when the backrest folding mechanism is actuated. The backrest folding mechanism may be operably connected with the seat folding mechanism so as to actuate folding of backrest 52 and seat 36 upon actuation of the backrest folding mechanism.

Seat 36 may be disposed farther from backrest 52 in the elevated forward position than in the lowered rearward position. Seat 36 may have a seating length which is shorter at a front area thereof when the seat is in the elevated forward position relative to that in the lower rearward seating position. Seat 36 may have main seating portion 38 (as described above) and an auxiliary seating portion 40 (as described above) operable to change orientation thereof relative to the main seating portion 38 when seat 36 is moved between the lowered rearward position and the elevated forward position.

Main seating portion 38 and auxiliary seating portion 40 may have a juxtaposed disposition when seat 36 is in its lowered rearward position, allowing the two portions together to accommodate a seated user in the lower rearward seating position of seat 36, in which the auxiliary seating portion (40) is operable at least indirectly by the seat manipulation mechanism 100 to change its orientation so as to reduce the seating length of seat 36, when the seat (36) is moved into its elevated forward seating position, allowing only main seating portion 38 to accommodate a seated user in the elevated forward seating position.

Main seating portion 38 may have the same orientation in the elevated and lowered positions allowing it to support a user in both these positions. The auxiliary seating portion 40 may be positioned lower than main seating portion 38 and oriented transversely thereto when seat 36 is in the elevated forward position.

Seat manipulation mechanism 100 may include at least one piston 108 (as described above) configured to store energy when seat 36 is moved towards the lower rearward position, and to release its stored energy when seat 36 is moved towards its elevated forward position.

Roll prevention mechanism 200 may include a roll prevention member 206 (as described above) associated with each first wheel 28*a* and be manipulable between a roll-enabling state in which front wheel 28 can be rolled; and a roll-arresting state in which the front wheel is prevented from rolling. Roll-prevention trigger member 218 (as described above) is activatable, at least indirectly, by seat manipulation mechanism 100 when seat 36 is brought thereby into its elevated forward seating position, and operable to bring roll prevention member 206 into the roll-arresting state.

Swivel prevention mechanism 300 (as described above) is operable to change the state of first wheels 28*a* from a swivel-enabling state, when seat 36 is in the lower rearward seating position, into a swivel arrested state in which first wheels 28*a* are prevented from swiveling when seat 36 is in the elevated forward seating position.

Swivel prevention mechanism 300 may include a swivel arresting member 306 (as described above) associated with front wheels 28 and manipulable between a swivel-enabling state in which the swivel-enabling state of the front wheels is allowed, and a swivel-arresting state in which swivel arresting member 306 prevents the front wheels 28 from swiveling. Swivel-prevention trigger member 104 (as described above) is activatable when the roll-prevention trigger member 104 brings the roll prevention member 206 into the roll-arresting state and operable to bring the swivel arresting member 306 into the swivel-arresting state.

Each first wheel 28*a* may be in the form of caster 34 (as described above) attached to first legs 22 by caster shaft 62 (as described above), and second swivel prevention mechanism 300*b* is operable to prevent, in the roll-only state and caster 34 is prevented from rotating more than 180 degrees about the caster shaft 62.

Roll prevention mechanism 200 and swivel prevention mechanism 300 may include activating elements extending within front legs 28, via which these mechanisms are connected to seat manipulation mechanism 100.

Frame 20 may be rigid and its legs 28, 32 may be unfoldable. Seat manipulation mechanism 100 may be connected to first legs 28*a* of frame 20. Frame 20 may include a lower portion and an upper portion extending upwardly therefrom. The lower portion may include first and second legs 22, 24 and a frame strengthening bar connecting between the second legs 24.

Frame 20 may include right and left frame members, each member having a frame member lower portion with one first and one second leg 22, 24, and a frame member upper portion. Backrest 52 may be connected to the frame member upper portions.

The device may include a pair of extendable user-support arms 46 connected to the frame member upper portions. The arms 46 are operable to transition between a lower arm position in which a portion of the arms is located in the frame upper portions for use when the device is in its first mode, and an extended arm position for use at least when the device is in its second mode.

It should be understood that the above description is merely exemplary and various embodiments of the present invention may be devised, mutatis mutandis, and that the features described in the above-described embodiments, and those not described herein, may be used separately or in any suitable combination; and the invention can be devised in accordance with embodiments not necessarily described above.

The invention claimed is:

1. A foldable user-support device configurable to be positioned on a ground surface comprising:

(a) a seat having a main, rearward seat portion and an auxiliary forward seat portion and manipulable between the following three positions:

i) a lower rearward seating position, in which the main seat portion and the auxiliary seat portion are disposed adjacent each other and aligned to provide a pre-determined seating length along a horizontal plane;

ii) an elevated seating position, in which the main seat portion maintains its orientation when the seat is moved from the lower rearward seating, and at least a majority of the auxiliary seat portion is lower relative to the main seat portion, and is oriented transversely thereto whereby the seating length of the seat is reduced; and iii) a folded position, in which the main seat portion and the auxiliary seat portion change their orientation relative to that in the lower seating position, and a length of their total projection on the horizontal plane is smaller than the reduced seating length of the seat in the elevated seating position; and b) a seat manipulation and folding mechanism configured to move the seat between the lower rearward seating position and the elevated seating position and between the elevated seating position and the folded position.

2. The device of claim 1, further comprising:

a frame;

a backrest operably connected to the frame so as to be moveable between:

a backrest deployed state in which the backrest is spaced rearwardly from the seat, at least a majority thereof is disposed above the plane defined by the seat, and the seat is oriented transversely to this plane when the seat is in the lower rearward position, and a backrest folded state in which the backrest is disposed adjacent the seat and extends along the seat when the seat is in the folded position; and a backrest folding mechanism operable to move the backrest between the deployed state and the folded state.

3. The device of claim 2, wherein the backrest folding mechanism is operably connected with the seat folding mechanism so as to activate the seat folding mechanism when the backrest folding mechanism is actuated; and wherein the seat comprises at least one of the following features:

the seat is disposed farther from the backrest in the elevated forward position than in the lower rearward position; or the seat has a seating length which is shorter at a front area thereof when the seat is in the elevated forward position relative to that in the lower rearward seating position; or the auxiliary seat portion is operable to change orientation thereof relative to the main seat portion when the seat is moved between the lower rearward position and the elevated forward position;

the main seat portion and the auxiliary seat portion have a juxtaposed disposition when the seat is in its lower rearward position, allowing the two portions together to accommodate a seated user in the lower rearward seating position of the seat; or the auxiliary portion is operable at least indirectly by the seat manipulation mechanism to change its orientation so as to reduce the seating length of the seat, when the seat is moved into its elevated forward seating position, allowing only the main portion to accommodate a seated user in the elevated forward seating position; or the main seat portion has the same orientation in the elevated and lower positions allowing it to support a user in both these positions; or the auxiliary seat portion is positioned lower than the main seat portion and oriented transversely thereto when the seat is in the elevated forward position.

4. The device of claim 1, wherein the seat manipulation mechanism includes at least one piston configured to store energy when the seat is moved towards the lower rearward position, and to release its stored energy when the seat is moved towards its elevated forward position.

5. The device of claim 1, wherein the device further comprises at least one of the following:

at least one front wheel and at least one roll prevention mechanism which comprises:

a roll prevention member associated with each front wheel and manipulable between a roll-enabling state in which the front wheel can be rolled and a roll-arresting state in which the front wheel is prevented from rolling; and a roll-prevention trigger member activatable at least indirectly by the seat manipulation mechanism when the seat is brought thereby into elevated forward seating position, and operable to bring the roll prevention member into the roll-arresting state; or at least one front wheel and at least one first swivel prevention mechanism which is operable to change the state of the front wheels from a swivel-enabling state, when the seat is in the lower rearward seating position, into a swivel arrested state in which the front wheels are prevented from swiveling when the seat is in the elevated forward seating position.

6. The device of claim 5, wherein the at least one first swivel prevention mechanism comprises:

a swivel arresting member associated with each front wheel and manipulable between a swivel-enabling state in which the swivel-enabling state of the front wheel is allowed, and a swivel-arresting state in which the swivel arresting member prevents each front wheel from swiveling; and a swivel-prevention trigger member activatable at least indirectly when the roll-prevention trigger member brings the roll prevention member into the roll-arresting state and operable to bring the swivel arresting member into the swivel-arresting state.

7. The device of claim 5, wherein each front wheel is in the form of a caster assembly attached to a front leg and comprising a swivel caster with said wheel and operable to allow swiveling of the wheel; the assembly further having at least one of the following features:

the at least one roll prevention mechanism is actuatable at least indirectly by either of the seat manipulation mechanism and by a roll and swivel control mechanism; or the at least one first swivel prevention mechanism and the at least one second swivel prevention mechanism are operable to lock the caster after its partial rotation to a first and a second predetermined angle, respectively, in the direction of rolling, the first and second angles being different; or the at least one roll prevention mechanism and the at least one first swivel prevention mechanism are actuatable simultaneously.

8. The device of claim 1, comprising a frame having a pair of front legs and a pair of rear legs; wherein the frame is rigid and at least its legs are non-foldable.

9. The device of claim 8, wherein the seat manipulation mechanism is connected to the front legs of the frame.

10. The device of claim 8, wherein the roll prevention mechanism and the swivel prevention mechanisms comprise activating elements extending within the front legs, via which these mechanisms are connected to the seat manipulation mechanism.

11. The device of claim 8, wherein the frame comprises a lower portion and an upper portion extending upwardly therefrom, and wherein the lower portion comprises the front and rear legs and a strengthening bar connecting between the rear legs.

12. The device of claim 8, wherein the frame comprises a right and a left frame member, each having a frame member lower portion with one first and one second leg, and a frame member upper portion.

13. The device of claim 12, wherein a pair of extendable user-support arms are connected to the frame member upper portions and are telescopically transitional between a lower arm position in which a part of the arms is located in the frame upper portions for use when the device is in the first mode, and an extended arm position for use at least when the device is in the second mode.

14. The device of claim 2, wherein in the deployed position of the backrest, the backrest forms with the plane defined by the seat when in the lower rearward seating position a first angle, and in the folded state, the backrest forms with said plane a second, acute angle smaller than the first angle.

15. The device of claim 14, wherein in the folded state of the backrest, at least a majority thereof extends along the frame in a side view of the device.

16. The device of claim 14, wherein in the folded state, at least most of the seat extends along the frame, in a side view of the device.

17. A bi-directional user-support device operable in, and manipulable between, a first, chair mode, in which the device is configured to accommodate a seated user facing in a first direction, and a second, rollator mode, in which the device is rollable at least in a second direction opposite to the first direction, by a standing user facing in the second direction, the device comprising:

a frame having an upper portion and a lower portion with a pair of first legs constituting front legs of the device when in the first mode, and a pair of second legs constituting front legs of the device when the second mode, the legs having respective wheels at their distal ends and the legs extending downwardly from the upper portion;

a seat attached to the frame and capable of being brought into a deployed position in which it can at least partially accommodate a seated user facing in the first direction and into a folded position in which at least a portion of the seat has an orientation different from that in the deployed position of the seat;

a backrest operably connected to the frame separately from the seat so as to enable the backrest to be brought into a backrest deployed state for providing support to the user's back, in which at least a majority thereof is positioned above the frame and above the seat and into a backrest folded state in which at least a majority of the backrest extends along the frame, in a side view of the device; and a backrest folding mechanism operable to move the backrest between the deployed state when bringing the device into the first mode, and the folded state when bringing the device into the second mode; and a seat folding mechanism attaching the seat to the frame and activatable at least indirectly by the backrest folding mechanism, and operable to move the seat into the folded position when bringing the backrest into the folded state thereof and into the deployed position when bringing the backrest into the deployed state thereof.

18. The device of claim 17, wherein in the deployed position of the backrest, the backrest forms with the plane defined by the seat when in the lower rearward seating position a first angle, and in the folded state, the backrest forms with said plane a second, acute angle smaller than the first angle.

19. The device of claim 17, wherein in the folded state of the backrest, at least a majority thereof extends along the frame in a side view of the device; and wherein optionally in the folded position, at least most of the seat extends along the frame, in a side view of the device.

20. The device of claim 17, wherein each mechanism is connected to at least one other mechanism of the device to activate and/or be activated thereby, by mechanical elements connected to and/or disposed within the frame.

* * * * *